United States Patent
Da et al.

(10) Patent No.: US 12,434,995 B2
(45) Date of Patent: Oct. 7, 2025

(54) ULTRATHIN GLASS WITH HIGH IMPACT RESISTANCE

(71) Applicant: SCHOTT Glass Technologies (Suzhou) Co. Ltd., Jiangsu (CN)

(72) Inventors: Ning Da, Jiangsu (CN); Feng He, Jiangsu (CN); Wei Xiao, Shanghai (CN); Jiaqi Meng, Jiangsu (CN); Ulrich Peuchert, Bodenheim (DE); Michael Drisch, Mainz (DE); Markus Heiss-Chouquet, Bischofsheim (DE); Inge Burger, Oestrich-Winkel (DE); Julia Weisshuhn, Mainz (DE)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 67 days.

(21) Appl. No.: 16/951,738

(22) Filed: Nov. 18, 2020

(65) Prior Publication Data

US 2021/0070650 A1  Mar. 11, 2021

Related U.S. Application Data

(63) Continuation of application No. PCT/CN2019/086869, filed on May 14, 2019, and a continuation of application No. PCT/CN2018/087560, filed on May 18, 2018.

(51) Int. Cl.
*C03C 3/118*  (2006.01)
*C03C 3/083*  (2006.01)
(Continued)

(52) U.S. Cl.
CPC .............. *C03C 3/118* (2013.01); *C03C 3/083* (2013.01); *C03C 3/085* (2013.01); *C03C 3/087* (2013.01);
(Continued)

(58) Field of Classification Search
CPC ......... C03C 3/118; C03C 3/083; C03C 3/085; C03C 3/087; C03C 3/091; C03C 3/093;
(Continued)

(56) References Cited

U.S. PATENT DOCUMENTS 5,017,521 A     5/1991  Yale
6,815,070 B1 *  11/2004  Burkle .................... C03C 17/30
                                                  427/166
(Continued)

FOREIGN PATENT DOCUMENTS

CN       102092940       6/2011
CN       103508674       1/2014
(Continued)

OTHER PUBLICATIONS

Matthewson, "Strength Measurement of Optical Fibers by Bending", Journal of the American Ceramic Society, vol. 69, No. 11, pp. 815-821, Nov. 1986.
(Continued)

*Primary Examiner* — Alicia J Weydemeyer
*Assistant Examiner* — Laura B Figg
(74) *Attorney, Agent, or Firm* — Ruggiero McAllister & McMahon LLC

(57) ABSTRACT

An ultrathin chemically toughened and subsequently etched glass article is provided. The article has a thickness of less than or equal to 0.4 mm and a breakage height (given in mm) of more than 200 multiplied by the thickness (t given in mm)). Further, the article has a breakage bending radius (given in mm) of less than 100000 multiplied by the thickness (t given in mm) and divided by a surface compressive stress (in MPa) measured at a first surface.

24 Claims, 2 Drawing Sheets

(51) Int. Cl.
  *C03C 3/085* (2006.01)
  *C03C 3/087* (2006.01)
  *C03C 3/091* (2006.01)
  *C03C 3/093* (2006.01)
  *C03C 3/097* (2006.01)
  *C03C 3/112* (2006.01)
  *C03C 4/18* (2006.01)
  *C03C 15/00* (2006.01)
  *C03C 17/34* (2006.01)
  *C03C 21/00* (2006.01)

(52) U.S. Cl.
  CPC .............. *C03C 3/091* (2013.01); *C03C 3/093* (2013.01); *C03C 3/097* (2013.01); *C03C 3/112* (2013.01); *C03C 4/18* (2013.01); *C03C 15/00* (2013.01); *C03C 17/3405* (2013.01); *C03C 21/002* (2013.01); *C03C 2204/00* (2013.01); *C03C 2217/78* (2013.01); *C03C 2218/11* (2013.01); *C03C 2218/365* (2013.01)

(58) Field of Classification Search
  CPC ........... C03C 3/097; C03C 3/112; C03C 4/18; C03C 15/00; C03C 17/3405; C03C 21/002; C03C 2204/00; C03C 2217/78; C03C 2218/11; C03C 2218/365
  See application file for complete search history.

(56) References Cited

U.S. PATENT DOCUMENTS

| | | | |
|---|---|---|---|
| 2004/0224834 A1* | 11/2004 | Kohli | C03C 3/087 501/70 |
| 2010/0028607 A1 | 2/2010 | Lee | |
| 2013/0202715 A1 | 8/2013 | Wang | |
| 2014/0370264 A1 | 12/2014 | Ohara | |
| 2015/0183680 A1 | 7/2015 | Barefoot | |
| 2015/0210588 A1* | 7/2015 | Chang | H05K 1/0306 428/220 |
| 2016/0002103 A1* | 1/2016 | Wang | B23K 26/0624 428/141 |

FOREIGN PATENT DOCUMENTS

| | | |
|---|---|---|
| CN | 104016577 | 9/2014 |
| CN | 105102386 | 11/2015 |
| JP | 2011529438 | 12/2011 |
| JP | 5293908 | 9/2013 |
| KR | 880003841 | 5/1988 |
| WO | 2014036267 | 3/2014 |
| WO | 2014139147 | 9/2014 |
| WO | 2015116465 | 8/2015 |
| WO | 2016037589 | 3/2016 |
| WO | 2016117479 | 7/2016 |
| WO | 2017123899 | 7/2017 |

OTHER PUBLICATIONS

International Preliminary Report on Patentability dated Nov. 24, 2020 for corresponding International Application PCT/CN2019/086869, 5 pages.
International Search Report dated Aug. 13, 2019 for corresponding International Application PCT/CN2019/086869.
Written Opinion dated Aug. 13, 2019 for corresponding International Application PCT/CN2019/086869.

* cited by examiner

ULTRATHIN GLASS WITH HIGH IMPACT RESISTANCE

CROSS REFERENCE TO RELATED APPLICATIONS

This application is a continuation of International Application PCT/CN2019/086869 filed May 14, 2019 and this application is a continuation of International Application PCT/CN2018/087560 filed May 18, 2018, the entire contents of both of which are incorporated herein by reference.

BACKGROUND

1. Field of the Invention

The invention relates to an ultrathin chemically toughened glass article having an improved impact resistance and high flexibility. The invention is also related to use of the high strength flexible glass article as flexible universal plane in flexible and printed electronics, sensor for touch control panels, finger print sensors, thin film battery substrates, mobile electronic devices, semiconductor interposers, flexible and bendable displays, solar cells, or other applications where a combination of high chemical stability, temperature stability, low gas permeability, flexibility, and low thickness is necessary. Besides consumer and industrial electronics said invention could also be used for protection applications in industrial production or metrology.

2. Description of Related Art

Thin glasses with different compositions are suitable substrate material for many applications where transparency, high chemical and thermal resistance, and defined chemical and physical properties are important. For example, alkaline free glasses can be used for display panels and as electronic packaging materials in wafer format. The alkaline contained silicate glasses are used for filter coating substrate, touch sensor substrate and fingerprint sensor module cover.

Aluminosilicate (AS), lithium aluminosilicate (LAS), borosilicate and soda-lime glasses are widely used for applications such as covers for finger print sensor (FPS), protection cover and display cover. In these applications, the glasses usually will be chemically toughened to achieve a high mechanical strength, as determined by special tests, e.g. 3-point bending (3PB), ball drop, anti-scratch and others.

Chemical toughening is a well-known process to increase strength of glass like soda lime glass or aluminosilicate (AS) glass or lithium aluminosilicate (LAS) or borosilicate glass that is used as cover glass for display applications, for example. In this circumstance, the surface compressive stresses (CS) are typically between 500 and 1,000 MPa and the depth of the ion-exchange layer is typically bigger than 30 µm, preferably bigger than 40 µm. For safety protection applications in transportation or aviation, AS Glass could have exchange layers bigger than 100 µm. Normally, a glass having both high CS and high DoL is targeted for all these applications, and thickness of glass usually ranges from about 0.5 mm to 10 mm.

In present times, the continuous demand for new functionality of product and wider area of applications call for glass substrates even thinner and lighter with high strength and flexibility. The fields in which ultrathin glass (UTG) is typically applied are protective cover of fine electronics. At the present time, the increasing demands for new functionalities of products and exploiting new and broad applications call for thinner and lighter glass substrates with new properties such as flexibility. Due to the flexibility of UTG such glasses have been searched and developed as cover glasses and displays for devices such as for example smartphones, tablets, watches and other wearables. Such a glass can also be used as a cover glass of a finger print sensor module and as camera lens cover.

However, if glass sheets get thinner than 0.5 mm, handling will get more and more difficult mainly due to defects such as cracks and chippings at the glass edges which lead to breakage. Also, the overall mechanical strength i.e. reflected in bending or impact strength will be significantly reduced. Strengthening of the glasses is extremely important to increase the bending strength.

Typically, <0.5 mm thick flat ultrathin glasses can be produced by direct hot-forming methods such as down draw, overflow fusion or special float procedures. Redraw methods are also possible. Compared with post-treated thin glass by chemical or physical method (e.g. produced via grinding and polishing), the direct hot-formed thin glass has much better surface uniformity and surface roughness because the surfaces are cooled down from high temperature melting state to room temperature. Down-drawn method could be used to produce glass thinner than 0.3 mm or even 0.1 mm, such as aluminosilicate glasses, lithium aluminosilicate glasses, alkali borosilicate glasses, soda lime glasses or alkaline free aluminoborosilicate glasses.

Although hot formed pristine surfaces are preferred in many application cases, chemically slimming of thicker glasses towards UTG thicknesses can lead to surface qualities that can be sufficiently good or even better for specific cases. In addition, handling, transport, manipulations might be easier for thicker glass than for UTG.

Chemical toughening of UTG has been described by some inventions. US2015183680 describes a toughening of <0.4 mm glass with limited range of central tension range and DoL>30 µm. However, DoL>30 µm leads to problems like fragility and self-breakage in ultrathin toughened glass. Furthermore, how the <0.4 mm thick glass is prepared is not illustrated in this patent application. WO 2014036267 has claimed glass should have a product of the compressive stress and depth of layer is greater than 21000 µm·MPa to have high flexural strength, while such high CS and DoL do not applied for ultrathin glass.

The overall flexural and impacting strength of ultrathin glass are influenced by several factors, such as edge quality, surface quality, chemically toughening, external coating film. How to improve the strength of ultrathin glass through chemically toughening has been described by some inventions. As mentioned in US20160002103A1, because of chemically toughening, the ultrathin glass sheet is more flexible and has extraordinary thermal shock resistance with the glass being easier to handle for processing. WO 2016/037589 A1 describes to do edge pre-treatment to increase the flexural strength of ultrathin glasses. WO 2014/139147 A1 discloses a toughening of <0.5 mm glass with compressive stress<700 MPa and DoL<30 µm. But here again, ultrathin toughened aluminosilicate glasses tend to have low mechanical resistance and break easily upon contact with sharp and hard objects. Generally, in order to get flexible glasses with an optimal bending radius it was assumed that DoL (the depth of the ion-exchanged layer) should reach a high value of approximately 0.1 to 0.2 times of the respective glass thickness (given in µm). However, it was found that known toughened ultrathin glasses have a quite low impact resistance. Impact resistance is the property of the UTG to withstand impact forces, e.g. when the glass article is dropped and the surface of the glass article gets in contact with an external object or when an external object drops onto the surface of the glass article.—Thus, such toughened flexible glass article can be easily broken when being punched by external objects. To improve the impact resistance of a thin foldable glass element WO 2017/123899 describes to provide a protective polymeric layer on the outer surface of the glass element so that the thin glass element cannot get in direct contact with external objects.

There are so many glass thicknesses, toughening procedures and results (different CS, DoL, CT) in connection with UTG that it is difficult to predict whether a glass article can be used within a special application or not. However, testing finished actual products (e.g. by dropping objects onto a foldable display cover until it breaks) is not only inefficient but also wastes the product itself. In order to reduce the risk of damage at customer side many tests have been developed by glass manufacturer and processors to prove the contact resistance and flexibility of a toughened ultrathin glass. For example, 3-point bending (3PB), ball drop, anti-scratch and others. However, those tests are elaborate and often fail.

Generally and contrary to a thick glass, ultrathin glass presents a more complex situation regarding strength. The purpose of the invention is to improve the impact resistance, overall flexibility and reliability of an ultrathin glass preferably without an additional polymeric layer which is laminated onto the first surface of an article which can get in contact with hard objects.

SUMMARY

Glass article: The glass article can be of any size. For example, it can be a long ultrathin glass ribbon that is rolled (glass roll), a large glass sheet, a smaller glass part cut out of a glass roll or out of a glass sheet or a single small glass article (like an FPS or display cover glass) etc.

Ultrathin glass: In the purpose of this invention ultrathin glass is a glass with a thickness of equal to or less than 0.4 mm, preferred of equal to or less than 0.14 mm, especially more preferred of equal to or less than 0.1 mm.

Thickness (t): The thickness of a glass article is the arithmetic average of the thickness of the sample to be measured.

Compressive Stress (CS): The induced compression among glass network after ion-exchange on the surface layer of glass. Such compression cannot be released by deformation of glass and sustained as stress. CS decreases from a maximum value at the surface of the glass article (surface CS) towards the inside of the glass article. Commercially available test machine such as FSM6000 (company "Luceo Co., Ltd.", Japan, Tokyo) can measure the CS by waveguide mechanism.

Depth of Layer (DoL): The thickness of ion-exchanged layer where CS exists on the surface of glass. Commercially available test machine such as FSM6000 (company "Luceo Co., Ltd.", Japan, Tokyo) can measure the DoL by wave guide mechanism.

Central Tension (CT): When CS is induced on one side or both sides of single glass sheet, to balance the stress according to the 3rd principle of Newton's law, a tension stress must be induced in the center region of glass, and it is called central tension. CT can be calculated from measured CS and DoL.

Average roughness (Ra): A measure of the texture of a surface. It is quantified by the vertical deviations of a real surface from its ideal form. Commonly amplitude parameters characterize the surface based on the vertical deviations of the roughness profile from the mean line. Ra is arithmetic average of the absolute values of these vertical deviations.

Breakage height (also called "pen drop height"): The breakage height is the height (given in mm) from which an object of a defined weight can fall onto a chemically toughened ultrathin glass article until the glass article breaks (that means: cracks are generated). The breakage height is determined by pen drop test which is described in more detail below.

Breakage bending radius (BBR): In this invention, BBR is taken as a measure for flexibility. The breakage bending radius (given in mm) is the minimum radius (r) of the arc at the bending position where a glass article reaches the maximum deflection before kinking or damaging or breaking. It is measured as the inside curvature at the bending position of a glass material. A smaller radius means greater flexibility and deflection of glass. The bending radius is a parameter depending on the glass thickness, the Young's modulus and the glass strength. Chemically toughened ultrathin glass has very small thickness, low Young's modulus and high strength. All the three factors contribute to low bending radius and better flexibility. The test for determining the BBR is described in more detail below.

The invention provides a chemically toughened and subsequently etched glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 100 MPa. The glass article has a breakage height (given in mm) of at least the figure of the thickness (t in mm) of the glass article multiplied by 200. The breakage height is determined in pen drop test in which the glass article is attached with its second surface to a 100 µm thick substrate, which consists of a 50 µm thick layer of polyethylene (PE) material and a 50 µm thick layer of a pressure sensitive adhesive (PSA) material, the second surface being in contact with the PSA layer, and the substrate with attached glass article is placed on a rigid support, the first surface of the glass article being orientated upwards and subsequently being impacted until breakage by a 4.5 g pen with a ball-point made from tungsten carbide having a diameter of 300 µm. Further the glass article according to the invention has a breakage bending radius (given in mm) of less than the thickness (t in mm) of the glass article multiplied by 100000, wherein the result is divided by the figure of the surface compressive stress (in MPa) measured at the first surface.

The inventors have found that chemically toughening of an ultrathin glass article on the one hand leads to an increase of bending performance but on the other hand leads to an undesirable decrease of the impact resistance which is very disadvantageous for most applications of UTG. Surprisingly it was found by the inventors, that slight material removal from the first surface of a toughened ultrathin glass article via etching is able improve the impact resistance of the article to a surprisingly high extent. The toughened and subsequently etched glass article according to the invention has both improved impact resistance and high flexibility.

Such a glass article according to the invention has an optimized stress profile. It has the balance between small bending radius and high impact resistance. Surprisingly it was found that the glass article will be reasonable strong enough to accommodate the applications of ultrathin glass articles especially in daily use if the following conditions are fulfilled:

The glass article has a breakage height (given in mm) of ≥200*t in the above mentioned pen drop test (t being the figure of the respective thickness of the glass article in the unit "mm") and its breakage bending radius (given in mm) is <100000*t/CS, wherein t is the thickness of the glass article (given in the unit "mm") and CS is the figure of the surface compressive stress (given in the unit "MPa"). That means in the latter calculation, the product is divided by a figure which corresponds to the respective measured surface compressive strength (given in MPa) at the first surface of the glass article.

By means of these criteria it can be decided whether a strengthened ultrathin glass article is suitably strong and flexible enough to be used for the respective application before it becomes part of a product. It was surprisingly found that the breakage height is strongly related to glass thickness and surface status. Therefore, thinner glass is especially sensitive to breakage caused by impacts.

Surprisingly it was found by the inventors that the breakage height criterion for an ultrathin glass can be described by the inventive factor 200 and the thickness of the glass article. The inventive factor will be valid if the breakage height of the glass article is determined in the pen drop test. For this dynamic test samples of glass articles are prepared as follows: The glass article is placed with its second surface on a 100 μm substrate, which consists of 50 μm thick layer of polyethylene (PE) material and a 50 μm thick layer of a pressure sensitive adhesive (PSA) material from 3M. In order to make and to ensure a tight homogenous contact between the glass article and the PSA layer the glass article and the PSA layer are homogenously loaded with a surface load of 2 g per mm2. The glass article is placed on a rigid support (e.g. a table) so that the PE-layer is in contact with the support and the first surface of the glass article is orientated upwards. Then the not laminated first surface of the glass article is impacted by a defined testing pen. The testing pen is a 4.5 g pen having a ball-point with a diameter of 300 μm made from tungsten carbide. For the test, the pen is placed in a testing machine with a certain, recorded height above the glass article, the longitudinal axis of the pen being orientated vertically to the first surface of the glass article wherein the ball-point is facing the glass article. Then the testing machine lets the pen drop onto the first surface. If the glass article is not broken, the drop height of the pen is increased step by step by a predetermined amount and the glass article is moved at least 3 mm order to avoid double or multiple hits onto the same point of the glass article. This procedure is repeated until the glass article breaks. The test is performed on small samples (e.g. 20 mm×50 mm) at room temperature of about 20° C. and relative humidity of about 50%. If a glass article of larger size is to be tested, small samples will be cut out using a diamond cutting wheel. No further edge treatment is performed on the small samples. The breakage height (also called "pen drop height"=PDH) is the maximum height that can be applied when the glass article breaks. Breaking means that the glass article gets a visible surface crack (crack is generated) or breaks into two or several pieces for the first time. The breakage is determined by the observation of naked eyes.

This test is adjusted to and is especially suitable for ultrathin glass articles and reproduces in a quite simple manner the above-mentioned problem, that is the impact contact between the glass article (e.g. a touch display) and an external object when the glass article falls down or is hit. In advantageous embodiments of the invention the glass article has a breakage height (given in mm) of 300*t in the above-mentioned pen drop test (t being the figure of the respective thickness of the glass article in the unit "mm".)

Surprisingly it was found by the inventors that the breakage bending radius criterion for an ultrathin glass can be described by the inventive factor 100000, the thickness and measured surface CS of the glass article. The inventive factor will be valid if the breakage bending radius of the glass article is determined in a 2-point bending test as described now. The breakage bending radius is determined by using a UTM (universal testing machine) on small samples (e.g. 20 mm×70 mm) at room temperature of about 20° C. and relative humidity of about 50%. If a glass article of larger size is to be tested, small samples will be cut out using a diamond cutting wheel. As-cut and then edge grinded samples are used. The glass article is brought into a bent position and its opposite ends are positioned between two parallel plates (steel plates). Then the distance between the plates is lowered so that the bending radius of the glass article decreases wherein the loading speed is 60 mm/min. The distance between the plates is recorded when the ultrathin glass article is kinking or damaging or breaking into two or several pieces which is determined by the signal of the UTM software. From that distance the corresponding bending radius of the glass article at the time of breakage can be calculated which is known to a skilled person and e.g. described by M. J. Matthewson et al. (Journal of the American Ceramic Society, Vol. 69, No. 11, pages 815-821, November 1986). Matthewson describes 2-point bending tests with glass fibers. However, the considerations made there can be transferred to the flat articles of the present invention. When small glass articles are tested parts of the outer surfaces of the tested glass samples should touch the respective plate just before breaking, kinking or damaging.

This 2-point bending test is adjusted to and is especially suitable for ultrathin glass articles and reproduces in a quite simple manner the above-mentioned problem, that is the bending of a glass article (e.g. an FPS or a touch display) upon loading it. In this context of the invention, it was found out that the 2-point bending method is more reliable than other known bending strength tests such as 3- and 4-point bending tests.

In advantageous embodiments of the invention the breakage bending radius (in mm) of the chemically toughened glass article is less than the thickness (t in mm) of the glass article multiplied by 80000 wherein the result is divided by the figure of the surface compressive stress (in MPa) measured at the first surface (<t*80000/CS). Preferably the breakage bending radius (in mm) can be less than the thickness (t in mm) of the glass article multiplied by 70000 wherein the result is divided by the figure of the surface compressive stress (in MPa) measured at the first surface (<t*70000/CS). In some variants the breakage bending radius (in mm) can be less than the thickness (t in mm) of the glass article multiplied by 60000 wherein the result is divided by the figure of the surface compressive stress (in MPa) measured at the first surface (<t*60000/CS).

As described above ultrathin glass articles are used in many fields of daily applications, e.g. as cover for flexible/foldable smartphones and tablets. To increase the strength of the cover glass toughening, preferably chemically toughening, is performed. In this context, in the prior art it was generally assumed that a high compressive strength and a DoL, which is roughly 0.1 to 0.2 multiplying the thickness (given in μm), is suitable. However, the impact resistance of such toughened glass articles is unsatisfactory up to now. Surprisingly it was found by the inventors that the glass articles according to the invention are more reliable concerning flexibility and impact resistance because of the performed additional surface modifying process, i.e. etching after chemically toughening. The reason for that is the improved and optimized stress profile of the glass articles according to the invention. The other way round, if an ultrathin glass article meets the claimed breakage height and the claimed breakage bending radius (referred to its respective thickness and measured surface CS), the breakage risk of the inventive glass article when being used (e.g. as cover glass for example of a finger print sensor) is low.

As mentioned above a chemically toughened glass article according to the invention can have quite different sizes. Therefore, in the course of determining the breakage height and breakage bending radius the following has to be taken into account:

In the case of larger glass articles (e.g. a glass roll or a large glass sheet), a plurality of samples is measured regarding breakage height using the pen drop test. For this a random sample N values is taken. N should be high enough to obtain a statistically ensured average value. Preferably at least 20, more preferably at least 30 samples are tested. The number of samples depends on the respective size of the glass article to be tested. The measured values are statistically evaluated using Weibull method. B10 value of Weibull distribution (that is the calculated height (in mm) wherein 10% of the samples are broken) is determined and taken to represent the claimed breakage height.

However, in the case of small glass articles (e.g. an individual small cover glass) a single measured value of breakage height is sufficient and is taken to represent claimed breakage height.

In the case of a number of measured values between 2 and 19 or 29 or more, the average of measured breaking height is taken to represent the claimed breakage height.

For the breakage bending radius an average value can be calculated. For this a random sample of N values is taken. The number of samples depends on the respective size of the glass article to be evaluated. Preferably N should be high enough to obtain a statistically ensured average value. Preferably at least 20, more preferably at least 30 samples are tested. Thus, a random sample of N values is taken for the breakage bending radii R1 . . . RN, and, for the values of these random samples, the average value $$\langle R \rangle = \frac{1}{N} \sum_{i=1}^{N} R_i$$

and the variance $$s = \sqrt{\frac{1}{N-1} \sum_{i=1}^{N} (R_i - \langle R \rangle)^2}$$

are calculated.

The average breakage bending radius is taken to represent claimed breakage bending radius. However, in the case of small glass articles (e.g. an individual small cover glass) a single measured value of breakage bending radius is sufficient and is taken to represent claimed breakage bending radius.

Average value and variance of the breakage height are calculated accordingly.

In an advantageous embodiment the chemically toughened and subsequently etched glass article has a breakage height at B10 (given in mm) of at least the figure of the thickness (t in mm) of the glass article multiplied by 150.

In one embodiment, the glass is an alkali-containing glass, such as alkali aluminosilicate glass, alkali silicate glass, alkali borosilicate glass, alkali aluminoborosilicate glass, alkali boron glass, alkali germanate glass, alkali borogermanate glass, alkali soda lime glass, and combinations thereof.

The ultrathin glass article according to the invention has a thickness of equal to or less than 400 µm, preferably less than or equal to 330 µm, also preferably less than or equal to 250 µm, further preferably less than or equal to 210 µm, preferably less than or equal to 180 µm, also preferably less than or equal to 150 µm, more preferably less than or equal to 130 µm. Especially preferred embodiments have a thickness of less than or equal to 100 µm, more preferably less than or equal to 80 µm, more preferably less than or equal to 75 µm, more preferably less than or equal to 70 µm, more preferably less than or equal to 65 µm, more preferably less than or equal to 60 µm, more preferably less than or equal to 55 µm, further preferably less than or equal to 50 µm, more preferably less than or equal to 45 µm, more preferably less than or equal to 40 µm, more preferably less than or equal to 35 µm, further preferably less than or equal to 30 µm, more preferably less than or equal to 25 µm, more preferably less than or equal to 20 µm, even preferably less than or equal to 10 µm. Such particularly thin glass articles are desired for various applications as described above. In particular, the thin thickness grants the glass flexibility. The thickness can be at least 5 µm.

According to an advantageous embodiment, the glass article can be a flat article and/or flexible article and/or deformable article. A "flat" article can for example be an essential plane or planar glass article. However, "flat" in the sense of the inventions also includes articles deformable or deformed in two or three dimensions.

A toughened and subsequently etched glass article according to the invention has a distinct modified first surface caused by an etching thickness removal after chemically toughening. An etching surface treatment has led to a material removal from the first toughened surface. After etching the final thickness of the glass article is a little bit smaller than the product thickness after the toughening process. In an advantageous embodiment the thickness removal (tremoved) from the first surface (i.e. the difference between the "thickness of chemically toughened glass article" and the "thickness of chemically toughened and subsequently etched glass article") is ≤0.005 mm, preferably ≤0.004 mm, preferably ≤0.003 mm. Preferred are glass articles having undergone a thickness removal of ≤0.002 mm, more preferably ≤0.001 mm, and/or ≥0.0002 mm. Thickness removal means that after the etching process the DoL of the first surface is a little bit lower than before the etching process. DoL is decreased. By means of this slight etching the impact resistance can be increased to a high extend. According to an advantage embodiment, the surface modified glass article has an increase of pen drop height of >20%, preferably >30%, more preferably >40%, more preferably >50% compared to the corresponding chemically toughened and non-etched glass article.

Etching can be performed by different ways. According to a first advantageous variant, the surface of the glass article has been etched with an acidic solution, wherein the acidic solution is preferably at least one selected from the group consisting of HF, $H_2SO_4$, $HNO_3$, HCl and, $NH_4HF_2$ in aqueous solution. Other advantageous etching substances can be $NaHF_2$/HCl, organic acids like acetic acid, citric acid etc. According to a second advantageous variant, the surface of the glass article has been etched with an alkaline solution, wherein the alkaline solution is preferably at least one selected from the group consisting of LiOH, NaOH and KOH in aqueous solution or e.g. NH4OH.

According to a further advantageous embodiment the glass article has a second compressive stress region extending from the second surface to a second depth in the glass article (DoL), the region is defined by a compressive stress (CS) wherein a surface compressive stress at the second surface (3) is at least 100 MPa. Preferably the second surface has also undergone a surface modification process after chemically toughening by etching as described above.

It is advantageous for the performance of the toughened and subsequently etched glass article when the surface compressive stress (CS) of the glass article is more than 100 MPa, preferably higher than 200 MPa, more preferably higher than 300 MPa, more preferably higher than 400 MPa, more preferably higher than 500 MPa, more preferably higher than 600 MPa. According to preferred embodiments of the invention CS is equal to or more preferably higher than 700 MPa, more preferably higher than 800 MPa, more preferably higher than 900 MPa, further preferably higher than 1000 MPa. However, CS should not be very high because the glass may otherwise be susceptible to self-breakage. Preferably, CS is equal to or lower than 2000 MPa, preferably equal to or lower than 1600 MPa, advantageously equal to or lower than 1500 MPa, more preferably equal to or lower than 1400 MPa. Some advantageous variants even have a CS of equal to or lower than 1300 MPa or equal to or lower than 1200 MPa.

The depth of layer (DoL) of the glass article before etching is in an advantageous embodiment from >1 μm to <40 μm. Preferably DoL is ≤30 μm, preferably ≤20 μm. DoL is preferably ≥3 μm, preferably ≥5 μm, preferably ≥7 μm. In connection with ultrathin glasses having a thickness of at most 100 μm preferably the DoL is ≤17 μm, preferably ≤15 μm, also preferably ≤13 μm, further preferably ≤11 μm, also preferably ≤10 μm.

Further it is advantageous for the glass article according to the invention when the glass article has a central tensile stress (CT) of more than or equal to 2 MPa, further preferably more than or equal to 28 MPa, further preferably more than or equal to 35 MPa, further preferably more than or equal to 43 MPa, further preferably more than or equal to 50 MPa, further preferably more than or equal to 66 MPa, further preferably more than or equal to 79 MPa, further preferably more than or equal to 90 MPa, further preferably more than or equal to 100 MPa.

To further improve the properties of the glass article according to the invention it may comprise at least on one surface a coated layer also called protective layer comprising a coating material. The protective layer can be applied by different methods such as chemical vapor deposition method (CVD), dip-coating, spin-coating, ink-jet, casting, screen printing, painting, bar coating, roller to roller coating and spraying, direct foiling with a soft solid layer may be advantageous. However, the invention is not limited to those procedures. Suitable materials are also known in the art.

The coated layer can comprise or consist of a polymer material that can be selected for example from the group consisting of a silicone polymer, a sol-gel polymer, polycarbonate (PC), polyethersulphone, polyacrylate, polyimide (PI), an inorganic silica/polymer hybrid, a cycloolefin copolymer, a polyolefin, a silicone resin, polyethylene (PE), polypropylene, polypropylenepolyvinyl chloride, polystyrene, styrene-acrylonitrile copolymer, thermoplastic polyurethane resin (TPU), polymethyl methacrylate (PMMA), ethylene-vinyl acetate copolymer, polyethylene terephthalate (PET), polybutylene terephthalate, polyamide (PA), polyacetal, polyphenyleneoxide, polyphenylenesulfide, fluorinated polymer, a chlorinated polymer, ethylene-tetrafluoroethylene (ETFE), polytetrafluoroethylene (PTFE), polyvinyl chloride (PVC), polyvinylidene chloride (PVDC), polyvinylidene fluoride (PVDF), polyethylene naphthalate (PEN), a terpolymer made of tetrafluroethylene, a terpolymer made of hexafluoropropylene, and a terpolymer made of vinylidene fluoride (THV) or polyurethane, or mixtures thereof.

Alternatively or additionally, the coated layer can comprise or consist of a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, crosslinking polyurethane resins, polymethacrylate reaction resins, and polyacrylate reaction resins, acrylic resin, acrylic-siloxane hybrid, epoxy siloxane hybrid etc. Such coating materials for a coated layer can form hard coatings with high hardness (preferably with a pencil hardness>2H).

Thus, the coated layer can comprise a polymer coating or a hard coating or both of them.

The hard coating can be directly deposited on a surface of the glass article or can be deposited on a polymer coating layer that has previously been coated/laminated on the glass article. An additional hard coating can improve the scratching resistance of polymer layer besides improving the impact resistance.

In general, by means of an additional coated layer the impact resistance of the glass article can be improved.

The breakage height of an ultrathin glass article can be significantly increased when a coated layer having thickness t2 of preferably ≥10 μm, advantageously ≥20 μm is applied on the first surface or on the second surface or on both the first surface and the second surface of the glass article according to the invention. Preferably the coated layer is provided on the first surface (top coating). Preferably the coated layer can be a polymer protective layer or a polymer protective layer with additional hard coating.

Preferably the thickness t2 of the coated layer applied on one surface (first surface or second surface) can be t2≤(0.3−t), wherein t is the thickness of the uncoated glass article. E.g. for a 50 μm thick glass article the thickness t2 of the coated layer can be ≤250 μm, preferably is can be ≤200 μm or ≤180 μm or ≤160 μm or ≤140 μm. The desired thickness t2 depends e.g. on the kind of coating material. Coated layers comprising a hard coating material can be even thinner. In advantageous variants t2 can be ≤(0.25−t) or ≤(0.2−t). Regardless of the thickness of the uncoated glass article, the thickness of the coated layer can advantageously be 250 μm, preferably is can be 200 μm or 180 μm or 160 μm or 140 μm or 120 μm or 100 μm.

According to an advantageous embodiment of the invention, a coated glass article has a breakage height (given in mm) of at ≥500*t when a coated layer with a thickness t2≤(0.3−t) is applied on the first surface and/or on the second surface, wherein t is the figure of the thickness (in mm) of the uncoated glass article and wherein the breakage height is determined in a pen drop test corresponding to the test described above. When the first surface of the glass article is coated, the coated layer is impacted by the pen in course of the pen drop test. When the second surface is coated, the coated layer is attached to the 100 μm thick substrate for determining the breakage height. I.e., for this dynamic test coated samples of glass articles are prepared and tested under the same conditions as uncoated glass articles described above.

Preferably at least the first surface of the glass article is covered by a coated layer (top coating). Alternatively, it is also possible and advantageous that the second surface of the glass article is covered by a coated layer (bottom coating). Advantageous variants of the glass article can have both a top coating and a bottom coating (double-sided coating). The coating materials for top coating and/or bottom coating can be the same or can be different.

In one advantageous variant of a glass article with double-sided coating the glass article is embedded between polymeric layers selected from the group consisting of polymer materials mentioned above.

In an advantageous development the coated glass article having a coated layer on the first surface and/or on the second surface has a breakage height (given in mm) of ≥600*t in the above-mentioned pen drop test (t being the figure of the respective thickness of the uncoated glass article in the unit "mm").

According to preferred embodiment of the invention, the coated glass article, having a coated layer with the thickness t2≤(0.3−t) provided on the first surface, has a breakage height (given in mm) of at least the figure of the thickness (t in mm) of the uncoated glass article multiplied by 500, preferably multiplied by 600, wherein the breakage height is determined in a pen drop test in which the glass article is attached with its second surface to a 100 μm thick substrate, which consists of a 50 μm thick layer of polyethylene (PE) material and a 50 μm thick layer of a pressure sensitive adhesive (PSA) material, the second surface being in contact with the PSA layer, and the substrate with attached glass article is placed on a rigid support, the first surface of the glass article being orientated upwards and the coated layer being impacted until breakage of the glass article by a 4.5 g pen with a ball-point made from tungsten carbide having a diameter of 300 μm.

In an advantageous further development, a coated layer (advantageously comprising a polymer material and/or a hard coating material as described above) can be provided at least on one edge of the glass article in order to improve the bending properties of the glass article and the resistance of the edge against forces/impacts during assembling and usage etc. Preferably the four glass edges are covered by the coated layer. Preferably the breakage bending radius (given in mm) is <100000*t/CS.

The glass articles can be additionally coated on the first surface for e.g. anti-reflection, anti-scratch, anti-fingerprint, anti-microbial, anti-glare and combinations of these functions.

These and other aspects, advantages, and features will be described in more detail in the following paragraphs, drawings and appended claims.

To reach good chemical toughening performance, the glass should content a fair amount of alkaline metal ions, preferably $Na_2O$, furthermore, adding less amount $K_2O$ to glass composition can also improve chemical toughening rate. Furthermore, it is found that adding $Al_2O_3$ to glass composition can significantly improve the toughening performance of glass.

$SiO_2$ is the major glass network former in the glasses of the present invention. Additionally, also $Al_2O_3$, $B_2O_3$ and $P_2O_5$ may be used as glass network formers. The content of the sum of $SiO_2$, $B_2O_3$ and $P_2O_5$ should not be less than 40% for common production method. Otherwise, the glass sheet may be difficult to form and could become brittle and loose transparency. A high $SiO_2$ content will require high melting and working temperature of glass production, usually it should be less than 90%. In preferred embodiments, the content of $SiO_2$ in the glass is between 40 and 75 wt.-%, more preferred between 50 and 70 wt.-%, even more preferably between 55 and 68 wt.-%. In other preferred embodiments, the content of $SiO_2$ in the glass is between 55 and 69 wt.-%, more preferred between 57 and 66 wt.-%, even more preferably between 57 and 63 wt.-%. In a further preferred embodiment, the content of $SiO_2$ in the glass is between 60 and 85 wt.-%, more preferred between 63 and 84 wt.-%, even more preferably between 63 and 83 wt.-%. In another further preferred embodiment, the content of $SiO_2$ in the glass is between 40 and 81 wt.-%, more preferred between 50 and 81 wt.-%, even more preferably between 55 and 76 wt.-%. Adding the $B_2O_3$ and $P_2O_5$ to $SiO_2$ could modify the network property and reduce the melting and working temperature of glass. Also, the glass network former has big influence on the CTE of glass.

In addition, the $B_2O_3$ in the glass network forms two different polyhedron structures which are more adaptable to loading force from outside. Addition of $B_2O_3$ can usually result in lower thermal expansion and lower Young's modulus which in turn leads to good thermal shock resistance and slower chemical toughening speed through which low CS and low DoL could be easily obtained. Therefore, the addition of $B_2O_3$ to ultrathin glass could greatly improve the chemical toughening processing window of ultrathin glass and widen the practical application of chemically toughened ultrathin glass. In preferred embodiments, the amount of $B_2O_3$ in the glass of the invention is between 0 and 20 wt.-%, more preferably between 0 and 18 wt.-%, more preferably between 0 and 15 wt.-%. In some embodiments the amount of $B_2O_3$ can be between 0 and 5 wt.-%, preferably between 0 and 2 wt.-%. In another embodiment the amount of $B_2O_3$ can be between 5 and 20 wt. %, preferably between 5 and 18 wt.-%. If the amount of $B_2O_3$ is too high, the melting point of the glass may be too high. Moreover, the chemical toughening performance is reduced when the amount of $B_2O_3$ is too high. $B_2O_3$ free variants can be preferred. $Al_2O_3$ works both as glass network former and glass network modifier. The $[AlO_4]$ tetrahedral and $[AlO_6]$ hexahedral will be formed in the glass network depending on the amount of $Al_2O_3$, and they could adjust the ion-exchanging speed by changing the size of space for ion-exchange inside glass network. Generally, the content of this component varies depending on the respective glass type. Therefore, some glasses of the invention preferably comprise $Al_2O_3$ in an amount of at least 2 wt.-%, more preferably in an amount of at least 10 wt.-% or even at least 15 wt.-%. However, if the content of $Al_2O_3$ is too high, the melting temperature and working temperature of glass will also be very high and the crystalline will easily formed to make glass loose the transparency and flexibility. Therefore, some glasses of the invention preferably comprise $Al_2O_3$ in an amount of at most 30 wt.-%, more preferably at most 27 wt.-%, more preferably at most 25 wt.-%. Some advantageous embodiments can comprise $Al_2O_3$ in an amount of at most 20 wt.-%, preferably of at most 15 wt.-% or of at most 10 wt.-%, or even preferably at most 8 wt. %, preferably at most 7 wt. %, preferably at most 6 wt. %, preferably at most 5 wt. %. Some glass variants can be free of $Al_2O_3$. Other advantageous glass variants can comprise at least 15 wt. %, preferably at least 18 wt. % $Al_2O_3$ and/or at most 25 wt. %, preferably at most 23 wt. %, more preferably at most 22 wt. % $Al_2O_3$.

Alkaline oxides like $K_2O$, $Na_2O$ and $Li_2O$ work as the glass work modifier. They can break glass network and form non-bridge oxide inside glass network. Adding alkaline could reduce the working temperature of glass and increase CTE of glass. Sodium and lithium content is important for ultrathin flexible glass which is chemical toughenable, for Na+/Li+, Na+/K+, Li+/K+ ion exchange is a necessary step for the toughening, the glass will not be toughened if it does not contain alkaline itself. However, sodium is preferred over lithium because lithium may significantly reduce the diffusivity of the glass. Therefore, some glasses of the invention preferably comprise $Li_2O$ in an amount of at most 7 wt. %, preferably at most 5 wt. %, more preferably at most 4 wt. %, more preferably at most 2 wt. %, more preferably at most 1 wt. %, more preferably at most 0.1 wt. %. Some preferred embodiments are even free of $Li_2O$. Depending on the glass type a lower limit for $Li_2O$ can be 3 wt. %, preferably 3.5 wt. %.

The glasses of the invention preferably comprise $Na_2O$ in an amount of at least 4 wt. %, more preferably at least 5 wt. %, more preferably at least 6 wt. %, more preferably at least 8 wt. %, more preferably at least 10 wt. %. Sodium is very important for the chemical toughening performance as the chemical toughening preferably comprises the ion exchange of sodium in the glass with potassium in the chemical toughening medium. However, the content of sodium should also not be too high because the glass network may be severely deteriorated and glass may be extremely hard to be formed. Another important factor is that ultrathin glass should have low CTE, to meet such requirement glass should not contain too much $Na_2O$. Therefore, the glasses preferably comprise $Na_2O$ in an amount of at most 30 wt. %, more preferred at most 28 wt. %, more preferred at most 27 wt. %, more preferred at most 25 wt. %, more preferred at most 20 wt. %.

The glasses of the invention may comprise $K_2O$. However, as the glasses are preferably chemically toughened by exchanging sodium ions in the glass with potassium ions in the chemical toughening medium, a too high amount of $K_2O$ in the glass will compromise the chemical toughening performance. Therefore, the glasses of the invention preferably comprise $K_2O$ in an amount of at most 10 wt. %, more preferred at most 8 wt. %. Some preferred embodiments comprise at most 7 wt. %, other preferred embodiments at most 4 wt. %, more preferred at most 2 wt. %, more preferred at most 1 wt. %, more preferred at most 0.1 wt. %. Some preferred embodiments are even free of $K_2O$.

But the total amount of alkaline content should preferably not be higher than 35 wt.-%, preferably not higher than 30 wt. %, more preferably not higher than 28 wt. %, more preferably not higher than 27 wt. %, even preferably not higher than 25 wt. %, for the glass network may be severely deteriorated and glass may be extremely hard to be formed. Some variants comprise an alkaline content of at most 16 wt.-%, preferably of at most 14 wt.-%. Another important factor is that ultrathin glass should have low CTE, to meet such requirement glass should not contain too much alkali elements. However, as described above, the glasses should contain alkali elements in order to facilitate chemical toughening. Therefore, the glasses of the present invention preferably comprise alkali metal oxides in an amount of at least 2 wt. %, more preferred at least 3 wt. %, more preferred at least 4 wt. %, more preferred at least 5 wt. %, more preferred at least 6 wt. %.

Alkaline earth oxides such as MgO, CaO, SrO, BaO work as the network modifier and decrease forming temperature of glass. These oxides can be added to adjust the CTE and Young's modulus of glass. Alkaline earth oxides have very important function that they can change refractive index of glass to meet special requirements. For example, MgO could decrease the refractive index of glass and BaO could increase the refractive index. The weight content of alkaline earth oxides should preferably not be higher than 40 wt. %, preferably not higher than 30 wt.-%, preferably not higher than 25 wt.-%, also preferably not higher than 20 wt.-%, more preferably not higher than 15 wt.-%, more preferably not higher than 13 wt.-%, more preferably not higher than 12 wt.-%. Some variants of glasses can comprise alkaline earth oxides of at most 10 wt.-%, preferably of at most 5 wt.-%, more preferably of at most 4 wt.-%. If the amount of alkaline earth oxides is too high, chemical toughening performance may be deteriorated. A lower limit for alkaline earth oxides can be 1 wt. %, or 5 wt. %. Moreover, the crystallization tendency may be increased if the amount of alkaline earth oxides is too high. Some advantageous variants can be free of alkaline earth oxides.

Some transition metal oxides in glass, such as ZnO and $ZrO_2$, have similar function as alkaline earth oxides and may be comprised in some embodiments. Other transition metal oxides, such as $Nd_2O_3$, $Fe_2O_3$, CoO, NiO, $V_2O_5$, $MnO_2$, $TiO_2$, CuO, $CeO_2$, and $Cr_2O_3$, work as coloring agent to make glass with specific optical or photonic functions, for example, color filter or light convertor. $O_3$, $SB_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The advantageous compositions below refer to different glass types before toughening.

In one embodiment, the ultrathin flexible glass is alkali metal aluminosilicate glass comprising the following components in the indicated amounts (in wt. %):

| Component | (wt. %) |
| --- | --- |
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Optionally, coloring oxides can be added, such as $Nd_2O_3$, $Fe_2O_3$, CoO, NiO, $V_2O_5$, $MnO_2$, CuO, $CeO_2$, $Cr_2O_3$, $O_3$, $SB_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The alkali metal aluminosilicate glass of the invention preferably comprises the following components in the indicated amounts (in wt. %):

| Component | (wt. %) |
| --- | --- |
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Optionally, coloring oxides can be added, such as $Nd_2O_3$, $Fe_2O_3$, CoO, NiO, $V_2O_5$, $MnO_2$, CuO, $CeO_2$, $Cr_2O_3$, 0-2 wt.

% of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the alkali metal aluminosilicate glass of the invention comprises the following components in the indicated amounts (in wt. %):

| Components | (wt. %) |
| --- | --- |
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

Optionally, coloring oxides can be added, such as $Nd_2O_3$, $Fe_2O_3$, CoO, NiO, $V_2O_5$, $MnO_2$, CuO, $CeO_2$, $Cr_2O_3$, 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is soda lime glass comprising the following components in the indicated amounts (in wt. %):

| Component | (wt. %) |
| --- | --- |
| $SiO_2$ | 40-81 |
| $Al_2O_3$ | 0-10 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 50-81 |
| $Al_2O_3$ | 0-8 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the soda lime glass of the invention comprises the following components in the indicated amounts (in wt. %):

| Component | (wt. %) |
| --- | --- |
| $SiO_2$ | 55-76 |
| $Al_2O_3$ | 0-6 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the soda lime glass of the invention comprises the following components in the indicated amounts (in wt. %):

| Component | (wt. %) |
| --- | --- |
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |

| Component | (wt. %) |
| --- | --- |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is lithium aluminosilicate glass comprising the following components in the indicated amounts (in wt. %):

| Component | (wt.-%) |
| --- | --- |
| $SiO_2$ | 55-69 |
| $Al_2O_3$ | 15-25 |
| $Li_2O$ | 3-7 |
| $Na_2O + K_2O$ | 0-30 |
| $MgO + CaO + SrO + BaO$ | 0-5 |
| ZnO | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. $O_3$, $SB_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The lithium aluminosilicate glass of the invention preferably comprises the following components in the indicated amounts (in wt. %):

| Component | (wt.-%) |
| --- | --- |
| $SiO_2$ | 57-66 |
| $Al_2O_3$ | 15-23 |
| $Li_2O$ | 3-5 |
| $Na_2O + KaO$ | 3-25 |
| $MgO + CaO + SrO + BaO$ | 1-4 |
| ZnO | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the lithium aluminosilicate glass of the invention comprises the following components in the indicated amounts (in wt. %):

| Component | (wt.-%) |
| --- | --- |
| $SiO_2$ | 57-63 |
| $Al_2O_3$ | 15-22 |
| $Li_2O$ | 3.5-5 |
| $Na_2O + K_2O$ | 5-20 |
| $MgO + CaO + SrO + BaO$ | 0-5 |
| ZnO | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is borosilicate glass comprising the following components in the indicated amounts (in wt. %):

| Component | (wt.-%) |
| --- | --- |
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass of the invention preferably comprises the following components in the indicated amounts (in wt. %):

| Component | (wt.-%) |
| --- | --- |
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass of the invention preferably comprises the following components in the indicated amounts (in wt. %):

| Component | (wt.-%) |
| --- | --- |
| $SiO_2$ | 63-83 |
| $Al_2O_3$ | 0-7 |

-continued

| Component | (wt.-%) |
| --- | --- |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $O_3$, $SB_2O_3$, $SnO_2$, $SO_3$, Cl and/or F could be also added as refining agents. 0-5 wt. % of rare earth oxides could also be added to add magnetic or photonic or optical functions to the glass sheet.

Typically, the ultrathin glass according to the invention could be produced by polishing down or etching from thicker glass. These two methods are under some circumstances not economical and lead to worse surface quality which is quantified by Ra roughness for example. Nevertheless, also thinned down surfaces might be good enough for specific applications.

Direct hot-forming production like down draw, overflow fusion method are preferred for the mass production. Redraw method is also advantageous. These mentioned methods are economical and the glass surface quality is high and the ultrathin glass with thickness from 5 µm (or even less) to 500 µm could be produced. For example, the down-draw/overflow fusion method could make pristine or fire-polished surface with roughness Ra less than 5 nm, preferred less than 2 nm, even preferred less than 1 nm. The thickness could also be precisely controlled ranging from 5 µm and 500 µm. The thin thickness grants the glass flexibility. Special float could produce ultrathin glass with pristine surface, it is economical and suitable for mass production too, but the glass produced by float has one side as tin-side which is different from the other side. The difference between two sides would cause warp issue of glass after chemical toughening, and affect printing or coating process because two sides have different surface energy. Another variant of UTG can be produced by sawing an ultrathin glass articles out of a thick glass ingot, bar, block etc.

The strengthening, as called as toughening, can be done by immersing glass into melt salt bath with potassium ions or cover the glass by potassium ions or other alkaline metal ions contained paste and heated at high temperature at certain time. The alkaline metal ions with larger ion radius in the salt bath or the paste exchange with alkaline metal ions with smaller radius in the glass article, and surface compressive stress is formed due to ion exchange.

A chemically toughened glass article of the invention is obtained by chemically toughening a chemically toughenable glass article. The toughening process could be done by immersing the ultrathin glass article into a salt bath which contains monovalent ions to exchange with alkali ions inside glass. The monovalent ions in the salt bath has radius larger than alkali ions inside glass. A compressive stress to the glass is built up after ion-exchange due to larger ions squeezing in the glass network. After the ion-exchange, the strength and flexibility of ultrathin glass are surprisingly and significantly improved. In addition, the CS induced by chemical toughening improves the bending properties of the toughened glass article and could increase scratch resistance of glass.

The most used salt for chemical toughening is Na+-contained or K+-contained melted salt or mixture of them. The commonly used salts are $NaNO_3$, $KNO_3$, NaCl, KCl, K++$2SO_4$, $Na_2SO_4$, $Na_2CO_3$, and $K_2CO_3$. Additives like NaOH, KOH and other sodium salt or potassium salt could be also used for better controlling the speed of ion-exchange, CS and DoL during chemical toughening. Ag+-containing or Cu2+-containing salt bath could be used to add anti-microbial function to ultrathin glass.

The chemical toughening is not limited to single step. It can include multi steps in salt bath with alkaline metal ions of various concentrations to reach better toughening performance. Thus, the chemically toughened glass article according to the invention can be toughened in one step or in the course of several steps, e.g. two steps.

The chemically toughened glass article according to the invention can have just one surface (first surface) where a compressive stress region extending from the first surface to a first depth in the glass article exists, wherein the region is defined by a compressive stress. In this case the glass article comprises only one toughened side. Preferably the glass article according to the invention also comprises a second surface—opposite to the first surface—where a second compressive stress region extending from the second surface to a second depth in the glass article (DoL) exists, the region is defined by a compressive stress wherein the surface compressive stress (CS) at the second surface is at least 100 MPa. This preferred glass article is toughened on both sides.

In a preferred embodiment of the invention, the surface modification after chemically toughening can be done by etching with an acidic solution comprising e.g. one or more of the following acids in aqueous solution: HF, $H_2SO_4$, HCl, $HNO_3$, $NH_4HF_2$. These acidic solutions can be combined with further pH<7 solutions. The concentration of hydrogen ions in the acidic solution can be less than 25 mol/L, preferably less than 5 mol/L, more preferably less than 1 mol/L and most preferably less than 0.1 mol/L. These etching conditions have proven to be particularly advantageous with the glass compositions mentioned below. It becomes immediately clear that these etching conditions can also be applied to other glass types or that other etching conditions can also be advantageous, depending on the specific requirements. In an alternative preferred embodiment of the invention, surface modification can also be done by etching with an alkaline solution comprising e.g. one or more of the following alkalis in aqueous solution: LiOH, NaOH, KOH. The concentration of OH ions in the alkaline solution can be less than 25 mol/L, preferably less than 20 mol/L, more preferably less than 15 mol/L and most preferably less than 10 mol/L.

Compressive stress (CS) mostly depends on the composition of glass. Higher content $Al_2O_3$ can be helpful to achieve higher compressive stress. To reach balanced glass hot-forming capability and chemical toughening performance, the surface compressive stress is preferably below 2000 MPa, preferably below 1200 MPa. After toughening, the ultrathin glass should have high enough compressive stress to achieve high strength. Therefore, preferably the surface compressive stress at the first surface and/or at the second surface is equal to or more than 100 MPa, preferably equal to or more than 200 MPa, more preferably equal to or more than 300 MPa, also preferably equal to or more than 400 MPa, further preferably equal to or more than 500 MPa. In especially preferred embodiments surface compressive stress is equal to or more than 600 MPa, further preferably equal to or more than 700 MPa, more preferably equal to or more than 800 MPa.

Generally, DoL depends on glass composition, but it can increase nearly infinitely with increased toughening time and toughening temperature. A defined DoL is essential to ensure the stable strength of toughened glass, but too high DoL increases the self-breakage ratio and the strength performance when the ultrathin glass article is under compressive stress, so DoL should be preferably controlled.

According to an advantageous embodiment of the invention the toughened glass article has a CT of less than or equal to 1000 MPa, more preferably less than or equal to 700 MPa, more preferably less than or equal to 300 MPa, more preferably less than or equal to 100 MPa. Some advantageous embodiments can have a CT of less than or equal to 65 MPa. Other advantageous embodiments can have a CT of less than or equal to 45 MPa. Some variants may even have a CT of less than or equal to 25 MPa.

As mentioned above CS, DoL and CT depends on the glass composition (glass type), glass thickness and toughening conditions.

It was found by the inventors that in the case of UTG aluminosilicate glasses the following features are advantageous:

A chemically toughened and subsequently surface etched glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 450 MPa, wherein the glass article has a breakage height (given in mm) of at least the figure of the thickness (t in mm) of the glass article multiplied by 200, preferably by 300, wherein the breakage height is determined in a pen drop test as described above, and the glass article has a breakage bending radius (given in mm) of <100000*t/CS, preferably <80000*t/CS, more preferred of <70000*t/CS, further preferred of <60000*T/CS, wherein the thickness t is given in mm and CS is the figure of surface compressive stress (given in MPa) measured at the first surface.

Preferably in aluminosilicate glasses the surface CS at the first surface and/or at the second surface of the glass article can be equal to or more than 450 MPa, preferably equal to or more than 500 MPa, preferably equal to or more than 550 MPa, preferably equal to or more than 600 MPa. In some advantageous embodiments the surface CS can be equal to or more than 700 MPa, more preferably equal to or more than 800 MPa.

In the case of UTG lithium aluminosilicate glasses the following features are advantageous:

A chemically toughened subsequently surface etched glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 350 MPa, wherein the glass article has a breakage height (given in mm) of at least the figure of the thickness (t in mm) of the glass article multiplied by 200, preferably by 300, wherein the breakage height is determined in a pen drop test as described above, and the glass article has a breakage bending radius (given in mm) of <100000*t/CS, preferably <80000*t/CS, more preferred of <70000*t/CS, further preferred of <60000*T/CS, wherein the thickness t is given in mm and CS is the figure of surface compressive stress (given in MPa) measured at the first surface.

Preferably the surface CS of lithium aluminosilicate glasses at the first surface and/or at the second surface of the glass article can be equal to or more than 350 MPa, equal to or more than 500 MPa, equal to or more than 600 MPa, preferably equal to or more than 700 MPa, more preferably equal to or more than 800 MPa.

In the case of UTG borosilicate glasses the following features are advantageous:

A chemically toughened subsequently surface etched glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 100 MPa, wherein the glass article has a breakage height (given in mm) of at least the figure of the thickness (t in mm) of the glass article multiplied by 200, preferably by 300, wherein the breakage height is determined in a pen drop test as described above, and the glass article has a breakage bending radius (given in mm) of <100000*t/CS, preferably <80000*t/CS, more preferred of <70000*t/CS, further preferred of <60000*T/CS, wherein the thickness t is given in mm and CS is the figure of surface compressive stress (given in MPa) measured at the first surface.

Preferably the surface CS at the first surface and/or at the second surface of borosilicate glasses can be equal to or more than 100 MPa, preferably equal to or more than 200 MPa, more preferably equal to or more than 300 MPa.

In the case of UTG soda lime glasses the following features are advantageous:

A chemically toughened subsequently surface etched glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 200 MPa at the first surface, wherein the glass article has a breakage height (given in mm) of at least the figure of the thickness (t in mm) of the glass article multiplied by 200, preferably by 300, wherein the breakage height is determined in a pen drop test as described above, and the glass article has a breakage bending radius (given in mm) of <100000*t/CS, preferably <80000*t/CS, more preferred of <70000*t/CS, further preferred of <60000*T/CS, wherein the thickness t is given in mm and CS is the figure of surface compressive stress (given in MPa) measured at the first surface.

Preferably the surface CS at the first surface and/or at the second surface of soda lime glasses can be equal to or more than 200 MPa, preferably equal to or more than 300 MPa.

The glass articles can be advantageously used in the field of cover and substrate for flexible and foldable electronics, like image sensor, display cover, screen protector. Further it can be used for example in the following application fields of display substrate or protection cover, finger print sensors cover, general sensor substrate or cover, cover glass of consumer electronics, protective covers of displays and other surfaces, especially bended surfaces. Moreover, the glass articles may also be used in the applications of display substrate and cover, fragile sensors, fingerprint sensor module substrate or cover, semiconductor package, thin film battery substrate and cover, foldable display, camera lens cover. In specific embodiments, the glass articles may be used as cover film for resistance screens, and expendable protective films for display screens, cell phones, foldable/flexible phones, cameras, gaming gadget, tablet, laptops, TV, mirror, windows, aviation widows, furniture, and white goods.

The invention is especially suitable for being used in flexible electronic devices providing thin, lightweight and flexible properties (e.g. curved displays, wearable devices). Such flexible devices also require flexible substrates e.g. for holding or mounting components. In addition, flexible displays with high contact resistance and small bending radii are possible.

According to the invention is also a method of producing a glass article according to the invention, the method comprising the following steps: Providing a composition of raw materials for the desired glass, Melting the composition, Producing a glass article in a flat glass process, Chemically toughening the glass article, Surface etching the glass article, and Optionally coating at least one surface of the article with a coating layer, wherein the step of etching comprises acid or alkaline etching which reduces preferably ≤0.005 mm, preferably ≤0.004 mm, preferably ≤0.003 mm, preferably more preferably ≤0.002 mm, more preferably ≤0.001 mm, and/or ≥0.0002 mm from the thickness of the glass article at the first surface. This etching after the toughening step has been described in detail above.

Preferably the flat glass process is a down draw process or a redraw process. It can also be a chemically slimming process in an advantageous variant.

Advantageously the chemically toughening process comprises an ion-exchange process. For mass production it will be favorable if the ion-exchange process comprises immersing the glass article or a part of the glass article into a salt bath containing monovalent cations. Preferably the monovalent cations are potassium ions and/or soda ions.

Further it is advantageous if the glass article or a part of the glass article is immersed in the salt bath at a temperature between 340° C. and 480° C. for 30 seconds to 48 hours.

For some glass types it may be preferred if the chemical toughening comprises two consecutive toughening steps, wherein the first step comprises toughening with a first toughening agent and the second step comprises toughening with a second toughening agent. Preferably the first toughening agent and the second toughening agent comprise or consist of $KNO_3$ and/or $NaNO_3$ and/or mixtures thereof.

Further details of the manufacturing and the toughening procedure have already been described above.

DETAILED DESCRIPTIONS

Table 1 shows the compositions of several typical embodiments (types 1-5) of direct hot-forming ultrathin glasses which are chemically toughenable.

TABLE 1

Embodiments of direct hot-forming UTG composition of different glass types

| | Composition (wt %) | | | | |
|---|---|---|---|---|---|
| | Type 1 | Type 2 | Type 3 | Type 4 | Type 5 |
| $SiO_2$ | 61 | 62 | 64 | 70 | 80 |
| $Al_2O_3$ | 17 | 18 | 4 | — | 3 |
| $Li_2O$ | — | 5 | — | — | — |
| $Na_2O$ | 12 | 10 | 6 | 10 | 4 |
| $K_2O$ | 4 | 1 | 7 | 8 | — |
| MgO | 4 | — | — | — | — |
| CaO | — | 1 | — | 6 | — |
| BaO | — | — | — | 2.5 | — |
| ZnO | — | — | 6 | 4 | — |
| $ZrO_2$ | 2 | 3 | — | — | — |
| $B_2O_3$ | — | 1 | 8 | 0.1 | 12 |
| $TiO_2$ | — | — | 4 | — | — |

Glass articles 1 of the different glass types were produced in a down draw process and chemically toughened to form ultrathin chemically toughened glass articles. Each ultrathin glass article has a first surface 2 and a second surface 3. In the embodiments shown each sample representing a glass article is toughened on both sides. So, there is a compressive stress region with a certain depth (DoL) on each side of the glass article. All samples were cut out of a larger glass article by using diamond cutting wheel. The samples were tested with surface etching as far as the inventive working examples are concerned.

Figure 1:
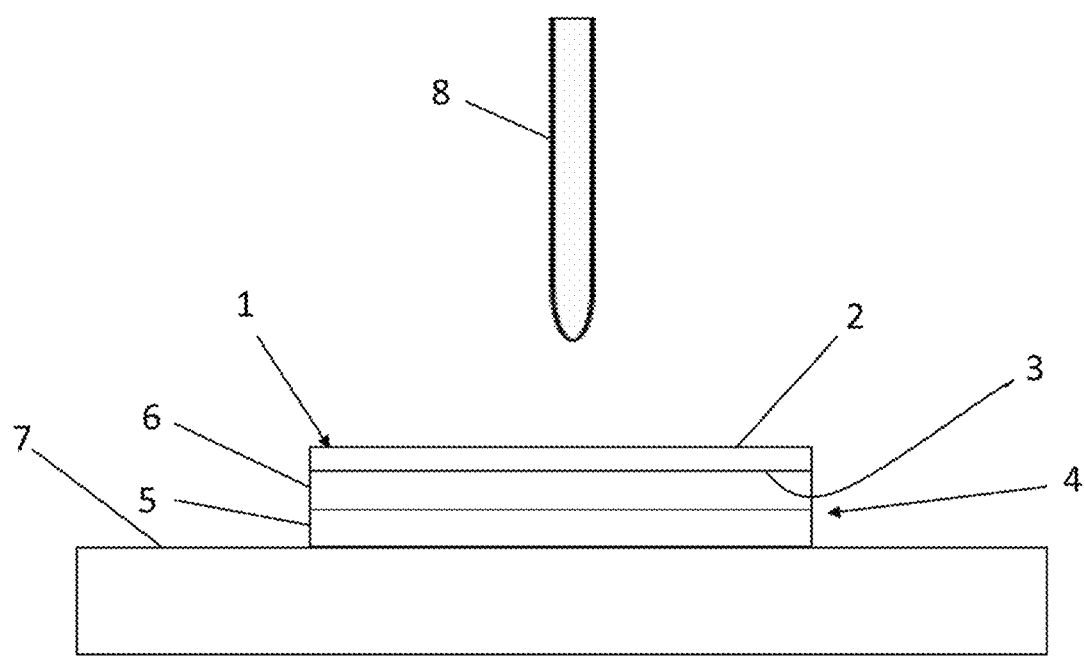
FIG. 1 shows a simplified schematic illustration of the pen drop test.

The impact resistance of comparison and inventive working examples was tested with the pen drop test which was described in detail above. A simplified illustration of that test is shown in FIG. 1. As can be seen, a glass article 1 is placed with its second surface 3 on a 100 µm substrate 4, which consists of a 50 µm thick PE-layer 5 and a 50 µm thick PSA-layer 6. The substrate 4 with attached glass article 1 is placed on a rigid support 7. The first surface 2 of the glass article 1 is orientated upwards and impacted until breakage by a 4.5 g pen 8 with a ball-point made from tungsten carbide having a diameter of 300 µm. Step by step the drop height of the pen is increased until the glass article 1 breaks. The pen drop test is performed on small samples of 20 mm×50 mm.

The breakage bending radius of comparison and inventive working examples was tested with the 2-point bending method as describes above. The bending test is performed on small samples of 20 mm×70 mm.

Comparison Embodiment—Glass Types 1-5

Many samples of glass types 1-5 having a length of 50 mm, a width of 20 mm and such having a length of 70 mm, a width of 20 mm and thicknesses of 0.05, 0.07, 0.1 and 0.145 mm were prepared and chemically toughened. After ion-exchange, the toughened samples were cleaned and measured with FSM 6000.

Thirty (30) toughened samples of each thickness and each DoL were tested and evaluated in respect of impact resistance using the pen drop test as described above. The average breakage height was calculated as described above, and the B10 height was calculated using Weibull method.

Further, for determining a breakage bending radius 30 toughened samples of each thickness and DoL were tested in the 2-point bending method described above. The average breakage bending radius was calculated as described above.

Figure 2:
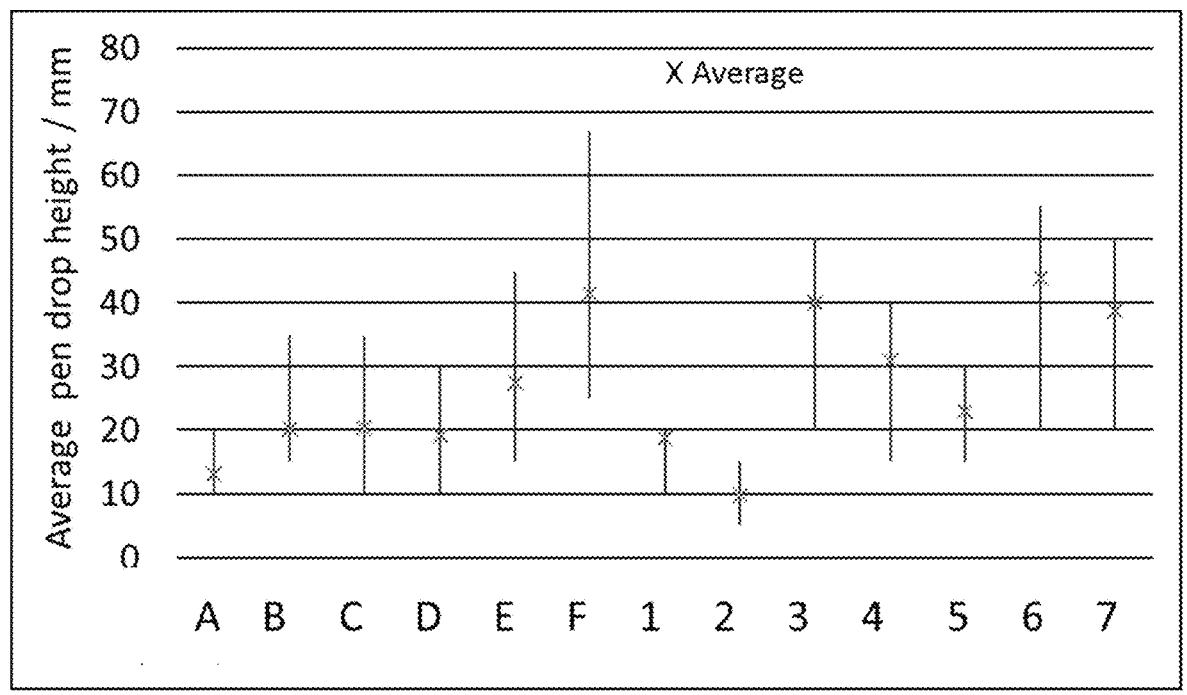
FIG. 2 shows an average pen drop height (breakage height) of comparison examples and inventive working examples of glass different glass types.
Figure 3:
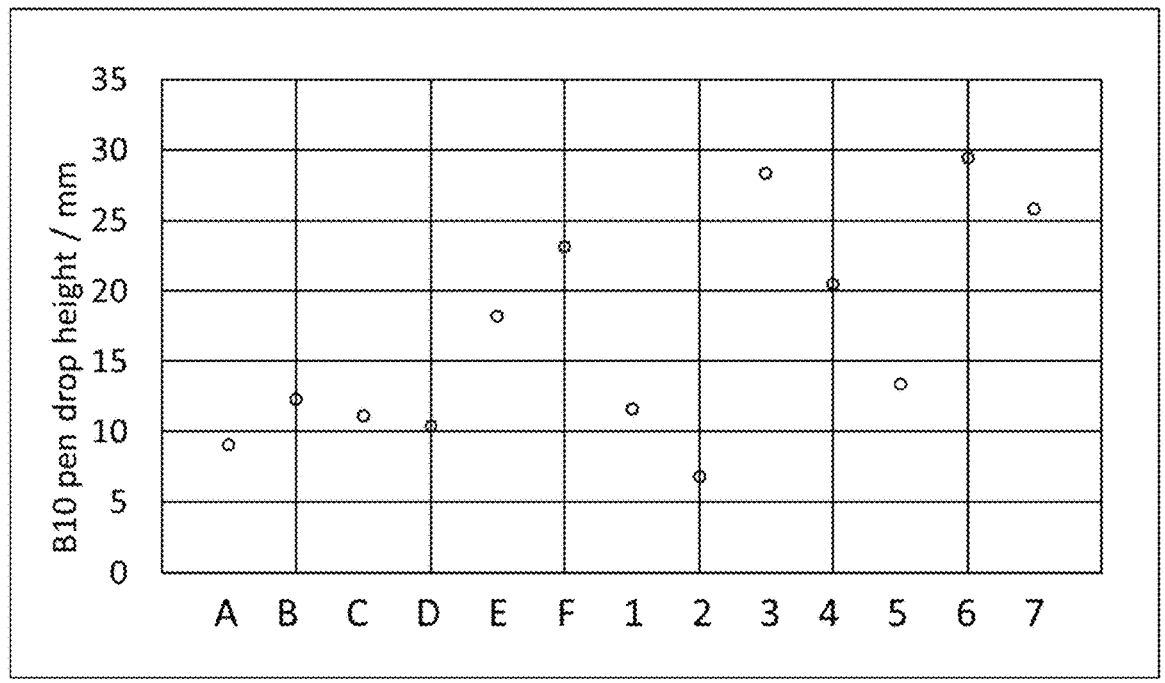
FIG. 3 shows a pen drop height (breakage height) of comparison examples and inventive working examples of different glass types.

Table 2 shows the test results concerning pen drop resistance and bending radius for the comparison examples A to F (average values and calculated B10 values using Weibull method). In FIG. 2 the results of the pen drop test (average breakage height) are given for the comparison examples A to F. A vertical line indicates the spread of the measured values around the corresponding average value (x) in each case. In FIG. 3 the calculated B10 heights are given for the comparison examples A to F.

TABLE 2

Glass types, toughening conditions and results (comparison examples)

| Comparison example | | A Glass Type 1 | B Glass Type 1 | C Glass Type 2 | D Glass Type 3 | E Glass Type 4 | F Glass Type 5 |
|---|---|---|---|---|---|---|---|
| Thickness (mm) | | 0.05 | 0.07 | 0.07 | 0.07 | 0.1 | 0.145 |
| Toughening | Temperature/° C. | 390 | 390 | 420 | 400 | 420 | 430 |
| condition | Time/min or h | 20 | 20 | 240 | 90 | 120 | 15 h |
| CS/MPa | | 710 | 724 | 674 | 300 | 372 | 97 |
| DoL/μm | | 10.5 | 11.3 | 8 | 10.5 | 10.6 | 12 |
| CT/MPa | | 257 | 173 | 100 | 64 | 50 | 10 |
| Pen drop height/mm | | 13.2 | 20.1 | 20.3 | 19.1 | 27.4 | 41.3 |
| B10 for pen drop/mm | | 9.1 | 12.3 | 11.1 | 10.4 | 18.2 | 23.2 |
| Average Breakage Bending radius/mm | | <3 | <4 | <6 | <10 | <15 | <50 |

Embodiment 1—Glass Type 1

Many samples of glass type 1 having a length of 50 mm, a width of 20 mm and such having a length of 70 mm, a width of 20 mm and thicknesses of 0.05 mm and 0.07 mm were prepared and chemically toughened. Different etching conditions (table 3) are employed (table 3). After ion-exchange and after etching, the samples were cleaned and measured with FSM 6000.

Thirty (30) toughened samples of each thickness and each DoL were tested and evaluated in respect of impact resistance using the pen drop test as described above. Table 3 shows the average pen drop height (=average breakage height, in the unit "mm") that can be applied until the glass sample breaks corresponding to different etching condition. Further the calculated B10 (in mm) are given. FIG. 2 shows the average breakage heights (the results of the pen drop test) of samples having a thickness of 0.05 mm, 0.07 mm. A vertical line indicates the spread of the measured values around the corresponding average value (x) in each case. In FIG. 3 the calculated B10 heights (pen drop test) are given for the inventive working examples 1 to 7.

Further, for determining an average breakage bending radius 20 toughened samples of each thickness and each DoL were tested in the 2-point bending method described above and evaluated as described above. As the samples are measured as cut (that means without any edge treatment) the bending radii of glass articles having treated edges will be even smaller.

Comparing the inventive working examples (in the following just called "examples") 1 to 7 with each other and with the comparison examples A and B the following can be seen:

Examples of glass type 1 with an etching treatment after chemically toughening predominantly show an increase in the pen drop height compared with comparison examples of the same glass type without etching treatment. The pen drop height can be raised by more than 30% up to more than 100%. E.g. the pen drop height of 0.05 mm thick example 1 is about 40% higher than the pen drop height of comparison example A of the same thickness, and the pen drop height of 0.07 mm thick example 4 is about 55% higher than the pen drop height of comparison example B of the same thickness. Example 6 even show an increase of pen drop height of more than 100%.

Regarding etched samples of the same glass type the pen drop height that can be reached depends on the applied etching medium. For 0.07 mm thick glass (glass type 1) the best result is achieved using a mixture of $NH_4HF_2$ and $HNO_3$ (example 6).

Further, within the use of one specific etching medium, the resulting pen drop height is dependent on the applied etching conditions (time, temperature, concentration). If the conditions are insufficient, the pen drop height of etched glass will get worse, as can be seen by comparing example 1 with example 2 or by comparing example 3 to 5 with each other. Here, lower concentrations of etching medium seem to lead to better results regarding pen drop height. In the worst case the pen drop height of an etched toughened glass

TABLE 3

Glass type 1, toughening conditions and results

| Working ex. | | Ex. 1 | Ex. 2 | Ex. 3 | Ex. 4 | Ex. 5 | Ex. 6 | Ex. 7 |
|---|---|---|---|---|---|---|---|---|
| Thickness (mm) | | 0.05 | 0.05 | 0.07 | 0.07 | 0.07 | 0.07 | 0.07 |
| Toughening | Temperature/° C. | 390 | 390 | 390 | 390 | 390 | 390 | 390 |
| condition | Time/min | 2 | 5 | 10 | 20 | 2 | 5 | 20 |
| CS/MPa | | — | 715 | 734 | 710 | — | 724 | 710 |
| DoL/μm | | 3.2 | 5.3 | 7.5 | 11.3 | 3.2 | 5.3 | 11.3 |
| Etching condition | | 0.2% $NH_4HF_2$ 7 min | 0.5% $NH_4HF_2$ 7 min | 0.2% $NH_4HF_2$ 7 min | 0.5% $NH_4HF_2$ 7 min | 1% $NH_4HF_2$ 10 min | 1% $NH_4HF_2$ + 1% $HNO_3$ 1 min | 3 mol/L NaOH + 3 mol/l KOH 16 h |
| CS after etching/MPa | | — | 424 | 620 | 604 | — | 474 | 650 |
| DoL after etching/μm | | 1.8 | 3.3 | 6.2 | 9.1 | 2.2 | 4.3 | 10.3 |
| CT/MPa | | | 29 | 67 | 106 | | 33 | 136 |
| Pen drop height/mm | | 18.7 | 9.7 | 40 | 31 | 23 | 43.7 | 38.7 |
| B10 for pen drop/mm | | 11.6 | 6.8 | 28.3 | 20.5 | 13.4 | 29.4 | 25.8 |
| Average Breakage Bending radius/mm | | <4 | <3 | <5 | <5 | <5 | <5 | <5 | can even be lower than that of an unetched glass (e.g. example 2 in comparison to comparative example A).

Other aluminosilicate glasses, for example a glass comprising (in wt. %) about: 62% $SiO_2$, 20% $Al_2O_3$, 4% $B_2O_3$, 13% $Na_2O$, 1% $MgO$, or a glass comprising (in wt %) about: 56% $SiO_2$, 24% $Al_2O_3$, 1% $B_2O_3$, 3% $Li_2O$, 10% $Na_2O$, 1% $ZnO$, 5% $P_2O_5$ may show similar results when prepared and tested under corresponding conditions.

Embodiment 2—Glass Type 2

Many samples of glass type 2 having a length of 50 mm, a width of 20 mm and such having a length of 70 mm, a width of 20 mm and thicknesses of 0.07 mm were prepared and chemically toughened. Different etching conditions (table 4) are employed. Example 7 was toughened in one step, while examples 8 and 9 are toughened in two steps. After ion-exchange and after etching, the samples were cleaned and measured with FSM 6000.

Thirty (30) toughened samples of each thickness and each DoL were tested and evaluated in respect of impact resistance using the pen drop test as described above. Table 4 shows the average pen drop height (=average breakage height, in the unit "mm") that can be applied until the glass sample breaks corresponding to different etching condition. In addition, the breakage bending radius was measured by the 2-point bending method described above. In each test/experiment a plurality of 30 samples of each thickness and each DoL-type were tested and evaluated as described above. Table 4 shows the sample conditions and results of the experiments.

Embodiment 3—Glass Type 3

Many samples of glass type 3 having a length of 50 mm, a width of 20 mm and such having a length of 70 mm, a width of 20 mm and thicknesses of 0.07 mm were prepared and chemically toughened. Different etching conditions (table 5) are employed. After ion-exchange and after etching, the samples were cleaned and measured with FSM 6000. The impact resistance was tested with the pen drop test which was described in detail above. In addition, the breakage bending radius was measured by the 2-point bending method described above. In each test/experiment a plurality of 30 samples of each DoL were tested and evaluated as described. Table 5 shows the sample conditions and results of the experiments.

TABLE 5

| Glass type 3 (0.07 mm), toughening conditions and results | | | | |
|---|---|---|---|---|
| Working ex. | | Ex. 11 | Ex. 12 | Ex. 13 |
| Thickness (mm) | | 0.07 | 0.07 | 0.07 |
| Toughening condition | Temperature/° C. | 400 | 400 | 400 |
| | Time/h | 1.5 | 3 | 3 |
| CS/MPa | | 310 | 301 | 294 |
| DoL/μm | | 10.2 | 14.1 | 14.1 |
| Etching condition/min | | 0.5% HF 1 min | 0.5% HF 1 min | 1% HF 2 min |
| CS after etching/MPa | | 289 | 287 | 255 |
| DoL after etching/μm | | 9.7 | 13.7 | 12.1 |
| CT/MPa | | 55 | 92 | 67 |
| Average pen drop height/mm | | 32.4 | 33.8 | 27.3 |

TABLE 4

| Glass type 2 (0.07 mm), toughening, etching conditions and results | | | | |
|---|---|---|---|---|
| Work. ex. | | Ex. 8 | Ex. 9 | Ex. 10 |
| Thickness (mm) | | 0.07 | 0.07 | 0.07 |
| Toughening condition | Step 1 | 420° C. 4 h (100% $KNO_3$) | 380° C. 0.5 h (45% $NaNO_3$ + 55% $KNO_3$) | 380° C. 0.5 h (45% $NaNO_3$ + 55% $KNO_3$) |
| | Step 2 | — | 380° C. 0.5 h (20% $NaNO_3$ + 80% $KNO_3$) | 380° C. 0.5 h (20% $NaNO_3$ + 80% $KNO_3$) |
| CS/MPa | Layer 1 | 674 | 470 | 470 |
| | Layer 2 | — | 43 | 43 |
| DoL/μm | Layer 1 | 7.4 | 2.9 | 3.9 |
| | Layer 2 | — | 14 | 14 |
| Etching condition/min | | 0.2% HF 1 min | 0.2% HF 1 min | 0.5% $NH_4HF_2$ + 0.1% $HNO_3$ 10 min |
| CS after etching/MPa | Layer 1 | 643 | 431 | — |
| | Layer 2 | — | 43 | 43 |
| DoL after etching/μm | Layer 1 | 7.0 | 2.5 | 1.9 |
| | Layer 2 | — | 14 | 14 |
| CT/MPa | | 80 | 32 | — |
| Average pen drop height/mm | | 40.1 | 37.4 | 18.2 |
| B10 for pen drop/mm | | 29.5 | 25.8 | 11.8 |
| Average breakage bending radius/mm | | <8 | <8 | <10 |

As can be seen from comparing example 8, example 9 and comparison example C the pen drop height can be raised by more than about 80% (example 9) because of the etching treatment. Example 8 has an even higher increase in pen drop height. However, using unsuitable etching conditions the pen drop height can be even lower compared with unetched samples (see example 10 compared to comparison example C).

TABLE 5-continued

| Glass type 3 (0.07 mm), toughening conditions and results | | | |
|---|---|---|---|
| Working ex. | Ex. 11 | Ex. 12 | Ex. 13 |
| B10 for pen drop/mm | 21.2 | 21.8 | 18.4 |
| Average breakage bending radius/mm | <12 | <12 | <12 |

As can be seen from comparing example 11, example 12, example 13 with comparison example D the pen drop height can be raised by more than about 40% (example 13) and at least 70% (example 11) because of the etching treatment. Example 12 has an even higher increase in pen drop height. By appropriately selecting the etching conditions using the same etching medium the pen drop height can be improved.

Embodiment 4—Glass Type 4

Many samples of glass type 4 having a length of 50 mm, a width of 20 mm and such having a length of 70 mm, a width of 20 mm and thicknesses of 0.1 mm were prepared and chemically toughened. Different etching conditions (table 6) are employed. After ion-exchange and after etching, the samples were cleaned and measured with FSM 6000. The impact resistance was tested with the pen drop test which was described in detail above. In addition, the breakage bending radius was measured by the 2-point bending method described above. In each test/experiment a plurality of 20 samples of each DoL were tested and evaluated as described. Table 6 shows the sample conditions and results of the experiments.

TABLE 6

Glass type 4 (0.1 mm), toughening conditions and results

| Working ex. | | Ex. 14 | Ex. 15 | Ex. 16 |
|---|---|---|---|---|
| Thickness (mm) | | 0.1 | 0.1 | 0.1 |
| Toughening | Temperature/° C. | 420 | 420 | 420 |
| condition | Time/h | 1 | 2 | 4 |
| CS/MPa | | 389 | 372 | 360 |
| DoL/μm | | 7.8 | 10.6 | 15.1 |
| Etching condition/min | | 1% $NH_4HF_2$ 2 min | 1% $NH_4HF_2$ 2 min | 1% $NH_4HF_2$ 6 min |
| CS after etching/MPa | | 367 | 352 | 324 |
| DoL after etching/μm | | 7.1 | 10 | 13.4 |
| CT/MPa | | 30 | 44 | 59 |
| Average pen drop height/mm | | 52.1 | 58.4 | 37.2 |
| B10 for pen drop/mm | | 28.7 | 36.3 | 22.6 |
| Average breakage bending radius/mm | | <20 | <20 | <20 |

As can be seen from comparing example 14, example 15, example 16 with comparison example E the pen drop height can be raised by more than about 35% (example 16) and more than 90% (example 14) because of the etching treatment. Example 15 has an even higher increase in pen drop height (more than 110%). By appropriately selecting the etching conditions using the same etching medium the pen drop height can be improved.

Embodiment 5—Glass Type 5

Many samples of glass type 5 having a length of 50 mm, a width of 20 mm and such having a length of 70 mm, a width of 20 mm and thicknesses of 0.145 mm were prepared and chemically toughened. Different etching conditions (table 7) are employed. After ion-exchange and after etching, the samples were cleaned and measured with FSM 6000. The impact resistance was tested with the pen drop test which was described in detail above. In addition, the breakage bending radius was measured by the 2-point bending method described above. In each test/experiment a plurality of 20 samples of each DoL were tested and evaluated as described. Table 7 shows the sample conditions and results of the experiments.

TABLE 7

Glass type 5 (0.145 mm), toughening conditions and results

| Working ex. | | Ex. 17 | Ex. 18 | Ex. 19 |
|---|---|---|---|---|
| Thickness/mm | | 0.145 | 0.145 | 0.145 |
| Toughening | Temperature/° C. | 420 | 430 | 430 |
| condition | Time/h | 2 | 6 | 15 |
| CS/MPa | | 118 | 112 | 97 |
| DoL/μm | | 4.3 | 7.7 | 12 |
| Etching condition/min | | 1% $NH_4HF_2$ 7 min | 2% $NH_4HF_2$ 7 min | 5% $NH_4HF_2$ 10 min |
| CS after etching/MPa | | 104 | 93 | 88 |
| DoL after etching/μm | | 4.1 | 7.2 | 10.5 |
| CT/MPa | | 3 | 5 | 7 |
| Average pen drop height/mm | | 43 | 70 | 65 |
| B10 for pen drop/mm | | 28 | 46 | 42 |
| Average breakage bending radius/mm | | <70 | <60 | <50 |

As can be seen from comparing example 18, example 19 with comparison example F the pen drop height can be raised by more than about 55% (example 19) and more than 65% (example 18) because of the etching treatment. However, example 17 has a comparatively low increase in pen drop height. This shows that it is necessary to appropriately select the etching conditions using the same etching medium for optimizing pen drop height.

In general, the strength of the ultrathin chemically toughened and etched glass articles according to the invention which is determined by the pen drop test follows Weibull distribution. B10 values defining the heights when 10% of the samples are broken are given in the figures.

From embodiments 1 to 5 it can be seen that chemically toughened and subsequently etched ultrathin glass articles of different glass types have an improved impact resistance, overall flexibility and reliability (even without an additional coated/polymeric layer provided on the first surface of the glass article which can get in contact with hard objects) compared to only chemically toughened glass articles.

Embodiment 6—Glass Type 1

Many samples of glass type 1 having a length of 50 mm, a width of 20 mm and such having a length of 70 mm, a width of 20 mm and thicknesses of 0.05 mm and 0.07 mm were cut, chemically toughened and subsequently etched. After ion-exchange and after etching, the samples were cleaned and measured with FSM 6000. Different coated layers (polymer layers and/or hard coating layers) are laminated/coated on the first surface (top coating), (table 8). Some examples were prepared having a coated layer both on the first surface and on the second surface (see example 27). The different coated layer-types of different thicknesses were applied to the glass articles by different methods:

The glass article was coated with a liquid polyimide (PI)-material via bar coating method and subsequently solidified for Examples 22, 24, and 28. After coating with PI material on the first surface, a 20 μm hard coating layer (epoxy-siloxane hybrid materials) was deposited on top of the PI-material layer using a roller to roller coating method to generate example 28.

Example 20 was laminated with a polyethylene (PE)-material via a commercial lamination machine.

Example 21 was laminated with a commercial polyethylene terephthalate (PET)-material via a commercial lamination machine.

Examples 23 and 25 were laminated with a commercial thermoplastic polyurethane (TPU)-material via a commercial lamination machine.

Examples 26 and 27 were prepared as follows: A 20 μm hard coating layer (epoxy-siloxane hybrid materials) was deposited on the first surface of the glass article using a known roller to roller coating method. In addition, in example 27 another 20 μm hard coating layer (epoxy-siloxane hybrid materials) was deposited on the second surface of the glass article using a known roller to roller coating method. Thus example 27 has both top coating and bottom coating.

Comparison examples G and H (glass type 1) were prepared and measured corresponding to examples 26 and 28, however a subsequent etching step after chemically toughening was not performed.

Thirty (30) toughened samples of each thickness and coated layer type were tested and evaluated in respect of impact resistance using the pen drop test as described in detail above. The coated first surface was impacted by the pen. For performing the impact test for example 27, the hard coating of the second surface of the glass article was placed on the 100 μm thick substrate. Table 7 shows the average pen drop height (=average breakage height, in the unit "mm") that can be applied until the glass sample breaks corresponding to different polymer layers and hard coating layers. Further the calculated B10 (in mm) are given.

coating can further improve the impact resistance (see examples 26, 27). An additional hard coating layer on top of a polymer top coating can further improve the impact resistance (see examples 28, 24). When comparing comparison example G with working example 26 and comparison example H with working example 28, it can be seen that the etching treatment after chemically toughening improves the impact resistance of the coated ultrathin glass articles. In addition, the coated polymer layer and hard coating layer can protect the glass article from external scratches, which may improve the reliability of the glass cover. A coated layer can also be advantageous for other UTG of other glass types.

What is claimed is:

1. A chemically toughened and subsequently etched glass article, comprising:
    glass having a first surface and a second surface, wherein the first and/or second surface is an etched surface;
    a thickness (t) of less than 0.4 mm between the first and second surfaces;
    a compressive stress region extending from the first surface to a first depth of layer (DoL), the compressive stress region having a compressive stress (CS) at the first surface that is at least 100 MPa;

TABLE 7

| Glass type 1, toughening conditions, different coated layers and results | | | | | | |
|---|---|---|---|---|---|---|
| Working ex. | Ex. 20 | Ex. 21 | Ex. 22 | Ex. 23 | Ex. 24 | Ex. 25 |
| Thickness (mm) | 0.05 | 0.05 | 0.05 | 0.05 | 0.07 | 0.07 |
| Toughening Temperature/° C. | 390 | 390 | 390 | 390 | 390 | 390 |
| condition Time/min | 20 | 20 | 20 | 20 | 20 | 20 |
| CS/MPa | 710 | 710 | 710 | 710 | 724 | 724 |
| DoL/μm | 10.5 | 10.5 | 10.5 | 10.5 | 11.3 | 11.3 |
| Etching conditions | 1% $NH_4HF_2$ + 1% $HNO_3$ 1 min | | | | | |
| CS/MPa | 684 | 684 | 684 | 684 | 698 | 698 |
| DoL/μm | 9.8 | 9.8 | 9.8 | 9.8 | 10.7 | 10.7 |
| Polymer layer | 50 μm PE | 60 μm PET | 80 μm PI | 100 μm TPU | 50 μm PI | 100 μm TPU |
| Hard Coating | — | — | — | — | — | — |
| Pen drop height/mm | 54.3 | 69.1 | 78.4 | 86.1 | 67.3 | 99.8 |
| B10 for pen drop/mm | 29.1 | 32.2 | 44.5 | 48.1 | 35.1 | 55.8 |

| Glass type 1, toughening conditions, different coated layers, results and Comparison examples (G, H) | | | | | |
|---|---|---|---|---|---|
| Working ex. | Ex. 26 | Ex. 27 | Ex. 28 | G | H |
| Thickness (mm) | 0.05 | 0.05 | 0.07 | 0.05 | 0.07 |
| Toughening Temperature/° C. | 390 | 390 | 390 | 390 | 390 |
| condition Time/min | 20 | 20 | 20 | 20 | 20 |
| CS/MPa | 710 | 710 | 724 | 710 | 724 |
| DoL/μm | 10.5 | 10.5 | 11.3 | 10.5 | 11.3 |
| Etching conditions | 1% $NH_4HF_2$ + 1% $HNO_3$ 1 mm | | | — | — |
| CS/MPa | 684 | 684 | 698 | — | — |
| DoL/μm | 9.8 | 9.8 | 10.7 | — | — |
| Polymer layer | — | — | 50 μm PI | — | 50 μm PI |
| Hard Coating | 20 μm hard coating on the first surface | 20 μm hard coating on both the first and second surface | 20 μm hard coating on PI layer on the first surface | 20 μm hard coating on the first surface | 20 μm hard coating on PI layer on the first surface |
| Pen drop height/mm | 32.1 | 39.1 | 74.2 | 31.4 | 63.4 |
| B10 for pen drop/mm | 22.7 | 24.8 | 43.1 | 18.7 | 38.5 |

As can be seen from comparing the coated examples of embodiment 6 (glass type 1) with examples 1 to 7 (glass type 1) having comparable thicknesses the pen drop height can be raised to a very high extent (at least 50%) by a coated layer. Both polymer layers and hard coating layers improve impact resistance. An additional bottom coating in addition to a top a breakage height (given in mm) of at least the thickness (t in mm) multiplied by a height factor of 200; and a breakage bending radius (given in mm) of less than the thickness (t in mm) multiplied by a radius factor of 100,000 and divided by the compressive stress (in MPa) at the first surface, and wherein the breakage height is determined in a pen drop test, wherein, during the pen drop test, the second surface is attached to substrate, wherein the substrate is 100 µm thick and consists of a first layer of polyethylene (PE) material that is 50 µm thick and second layer of a pressure sensitive adhesive (PSA) material that is 50 µm thick layer, wherein the second surface is in contact with the second layer, and wherein, during the pen drop test, the substrate and the glass article are placed on a rigid support with the first surface orientated upwards and impacted until breakage by a 4.5 g pen with a ball-point made from tungsten carbide having a diameter of 300 µm, and wherein the glass comprises (in wt. %):
$K_2O$ greater than 0 to 4; and
$Li_2O+Na_2O+K_2O$ 16 to 30.

2. The article of claim 1, wherein the radius factor is 60,000 and/or the height factor is 300.

3. The article of claim 1, wherein the breakage height has a B10 value of Weibull distribution (given in mm) with a height factor of 150.

4. The article of claim 1, wherein the thickness selected from a group consisting of less than or equal to 0.33 mm, less than or equal to 0.25 mm, less than or equal to 0.21 mm, less than or equal to 0.18 mm, less than or equal to 0.15 mm, less than or equal to 0.13 mm, less than or equal to 0.1 mm, less than or equal to 0.08 mm, less than or equal to 0.07 mm, less than or equal to 0.05 mm, less than or equal to 0.03 mm, and less than or equal to 0.01 mm.

5. The article of claim 1, wherein the thickness is greater than or equal to 0.005 mm.

6. The article of claim 1, wherein the first surface is the etched surface caused by an etching that removed from the first surface, after toughening, less than or equal to 0.005 mm and/or greater than or equal to 0.0002 mm.

7. The article of claim 6, wherein the pen drop test has a height that is increased by greater than 20% after the etching.

8. The article of claim 6, wherein the etching comprising etching with an acidic solution selected from a group consisting of HF, $H_2SO_4$, $HNO_3$, HCl, $NH_4HF_2$, and any combinations thereof or etching with an alkaline solution selected from a group consisting of LiOH, NaOH, KOH, and any combinations thereof.

9. The article of claim 1, further comprising a central tensile stress (CT) selected from a group consisting of more than or equal to 2 MPa, more than or equal to 28 MPa, more than or equal to 43 MPa, more than or equal to 66 MPa, more than or equal to 79 MPa, and more than or equal to 100 MPa.

10. The article of claim 1, further comprising a coating material forming a coating layer on the first surface and/or the second surface.

11. The article of claim 10, wherein the coated layer is on the first surface and has a second thickness that is ≤(0.3−t) and wherein the height factor is 500.

12. The article of claim 10, wherein the coating material is selected from a group consisting of a silicone polymer, a sol-gel polymer, polycarbonate (PC), polyethersulphone, polyacrylate, polyimide (PI), an inorganic silica/polymer hybrid, a cycloolefin copolymer, a polyolefin, a silicone resin, polyethylene (PE), polypropylene, polypropylenepolyvinyl chloride, polystyrene, styrene-acrylonitrile copolymer, thermoplastic polyurethane resin (TPU), polymethyl methacrylate (PMMA), ethylene-vinyl acetate copolymer, polyethylene terephthalate (PET), polybutylene terephthalate, polyamide (PA), polyacetal, polyphenyleneoxide, polyphenylenesulfide, fluorinated polymer, a chlorinated polymer, ethylene-tetrafluoroethylene (ETFE), polytetrafluoroethylene (PTFE), polyvinyl chloride (PVC), polyvinylidene chloride (PVDC), polyvinylidene fluoride (PVDF), polyethylene naphthalate (PEN), a terpolymer made of tetrafluroethylene, a terpolymer made of hexafluoropropylene, and a terpolymer made of vinylidene fluoride (THV) or polyurethane, duroplastic reaction resin, phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, crosslinking polyurethane resins, polymethacrylate reaction resins, and polyacrylate reaction resins, acrylic resin, acrylic-siloxane hybrid, and epoxy siloxane hybrid.

13. The article of claim 1, further comprising an edge surface between the first surface and/or the second surface and a coating material forming a coating layer on the edge surface.

14. The article of claim 1, further comprising a second compressive stress region extending from the second surface to a second depth of layer (DoL), the second compressive stress region having a compressive stress (CS) at the second surface that is at least 100 MPa.

15. The article of claim 14, wherein the first surface is the etched surface and wherein the second surface is a second etched surface caused by an etching that removed from the second surface, after toughening, less than or equal to 0.005 mm and/or greater than or equal to 0.0002 mm.

16. The article of claim 14, wherein the compressive stress (CS) at the second surface is selected from a group consisting of more than 200 MPa, more than 300 MPa, more than 400 MPa, more than 500 MPa, more than 600 MPa, more than 700 MPa, and more than 800 MPa.

17. The article of claim 1, wherein the compressive stress (CS) at the first surface is selected from a group consisting of more than 200 MPa, more than 300 MPa, more than 400 MPa, more than 500 MPa, more than 600 MPa, more than 700 MPa, and more than 800 MPa.

18. The article of claim 1, wherein the glass further comprises (in wt. %):

| | |
|---|---|
| $SiO_2$ | 40-81 |
| $Al_2O_3$ | 0-10 |
| $B_2O_3$ | 0-5 |
| MgO + CaO + SrO + BaO + ZnO | 5-30 |
| $TiO_2 + ZrO_2$ | 0-7 |
| $P_2O_5$ | 0-2. |

19. The article of claim 1, wherein the glass further comprises (in wt. %):

| | |
|---|---|
| $SiO_2$ | 55-69 |
| $Al_2O_3$ | 15-25 |
| $Li_2O$ | 3-7 |
| MgO + CaO + SrO + BaO | 0-5 |
| ZnO | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2. |

20. The article of claim 1, wherein the glass article is configured for a use selected from a group consisting of a cover film for a resistance screen, an expendable protective film for a display screen, a foldable/flexible phone, a camera, a gaming gadget, a tablet, a laptop, a TV, a mirror, a window, an aviation widows, furniture, a white good, a display substrate, display cover, a fragile sensor, a fingerprint sensor module substrate, a fingerprint sensor module cover, a semiconductor package, a thin film battery substrate, and a foldable display, and a camera lens cover.

21. The article of claim 1, wherein the glass comprises $K_2O$, in wt. %, from greater than 0 to less than 2.5%.

22. The article of claim 1, wherein the glass comprises $K_2O$, in wt. %, from greater than 0 to at most 2%.

23. A chemically toughened and subsequently etched glass article, comprising:
   glass having a first surface and a second surface;
      a thickness (t) of less than 0.4 mm between the first and second surfaces;
      a compressive stress region extending from the first surface to a first depth of layer (DoL), the compressive stress region having a compressive stress (CS) at the first surface that is at least 100 MPa;
      a breakage height (given in mm) of at least the thickness (t in mm) multiplied by a height factor of 200; and
      a breakage bending radius (given in mm) of less than the thickness (t in mm) multiplied by a radius factor of 100,000 and divided by the compressive stress (in MPa) at the first surface, and
   wherein the breakage height is determined in a pen drop test, wherein, during the pen drop test, the second surface is attached to substrate, wherein the substrate is 100 μm thick and consists of a first layer of polyethylene (PE) material that is 50 μm thick and second layer of a pressure sensitive adhesive (PSA) material that is 50 μm thick layer, wherein the second surface is in contact with the second layer, wherein, during the pen drop test, the substrate and the glass article are placed on a rigid support with the first surface orientated upwards and impacted until breakage by a 4.5 g pen with a ball-point made from tungsten carbide having a diameter of 300 μm, and
   wherein the glass comprises (in wt. %):

| | |
|---|---|
| $SiO_2$ | 40-75 |
| $Al_2O_3$ | 10-30 |
| $K_2O$ | greater than 0 to 10% |
| $Li_2O + Na_2O + K_2O$ | greater than 14 to 30 |
| $MgO + CaO + SrO + BaO + ZnO$ | 0-15 |
| $TiO_2 + ZrO_2$ | 0-15 |
| $P_2O_5$ | 0-10, and | wherein the glass is free from $B_2O_3$.

24. A chemically toughened and subsequently etched glass article, comprising:
   glass having a first surface and a second surface, wherein the first and/or second surface is an etched surface;
   a thickness (t) of less than 0.4 mm between the first and second surfaces;
   a compressive stress region extending from the first surface to a first depth of layer (DoL), the compressive stress region having a compressive stress (CS) at the first surface that is at least 100 MPa;
   a breakage height (given in mm) of at least the thickness (t in mm) multiplied by a height factor of 200; and
   a breakage bending radius (given in mm) of less than the thickness (t in mm) multiplied by a radius factor of 100,000 and divided by the compressive stress (in MPa) at the first surface, and
   wherein the breakage height is determined in a pen drop test, wherein, during the pen drop test, the second surface is attached to substrate, wherein the substrate is 100 μm thick and consists of a first layer of polyethylene (PE) material that is 50 μm thick and second layer of a pressure sensitive adhesive (PSA) material that is 50 μm thick layer, wherein the second surface is in contact with the second layer, and wherein, during the pen drop test, the substrate and the glass article are placed on a rigid support with the first surface orientated upwards and impacted until breakage by a 4.5 g pen with a ball-point made from tungsten carbide having a diameter of 300 μm, and
   wherein the glass comprises (in wt. %):
      $K_2O$ greater than 0 to 4; and
      $Na_2O$ greater than or equal to 14 to 30.

* * * * *